United States Patent
Prasad et al.

(10) Patent No.: US 12,308,910 B2
(45) Date of Patent: May 20, 2025

(54) OPTIMIZING BIAS VOLTAGES IN RIS AIDED COMMUNICATIONS

(71) Applicant: QUALCOMM Incorporated, San Diego, CA (US)

(72) Inventors: Narayan Prasad, Westfield, NJ (US); Yavuz Yapici, Florham Park, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 21 days.

(21) Appl. No.: 18/165,918

(22) Filed: Feb. 7, 2023

(65) Prior Publication Data

US 2024/0267096 A1 Aug. 8, 2024

(51) Int. Cl.
| | |
|---|---|
| *H04L 5/12* | (2006.01) |
| *H04B 7/0456* | (2017.01) |
| *H04B 7/145* | (2006.01) |
| *H04W 28/086* | (2023.01) |

(52) U.S. Cl.
CPC .......... *H04B 7/0456* (2013.01); *H04B 7/145* (2013.01); *H04W 28/086* (2023.05)

(58) Field of Classification Search
CPC .... H04B 7/0456; H04B 7/145; H04W 28/086
USPC ............... 375/262, 260, 259, 219, 295, 316
See application file for complete search history.

(56) References Cited

U.S. PATENT DOCUMENTS

| | | | |
|---|---|---|---|
| 2022/0014935 A1 | 1/2022 | Haija et al. | |
| 2024/0137887 A1* | 4/2024 | Jeong | H04W 56/0045 |
| 2024/0195458 A1* | 6/2024 | Oh | H04B 7/04013 |

FOREIGN PATENT DOCUMENTS

WO 2021236510 A1 11/2021

OTHER PUBLICATIONS

International Search Report and Written Opinion—PCT/US2024/010707—ISA/EPO—Apr. 29, 2024.

* cited by examiner

*Primary Examiner* — Zewdu A Kassa

(74) *Attorney, Agent, or Firm* — Procopio, Cory, Hargreaves & Savitch LLP/Qualcomm Incorporated

(57) ABSTRACT

A network entity (e.g., a base station) may transmit, for a network node (e.g., a RIS), a RIS pattern configuration. The network entity may transmit, for the network node, a diode bias voltage configuration for a plurality of diodes or a plurality of RIS elements of the network node. The diode bias voltage configuration may be associated with the RIS pattern configuration. The network node may forward at least one transmission from a first device to a second device via the network node in one of an uplink, a downlink, or a sidelink based on the RIS pattern configuration and the diode bias voltage configuration.

30 Claims, 14 Drawing Sheets

OPTIMIZING BIAS VOLTAGES IN RIS AIDED COMMUNICATIONS

TECHNICAL FIELD

The present disclosure relates generally to communication systems, and more particularly, to power saving techniques at a reconfigurable intelligent surface (RIS) in a wireless communication system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a network node. The apparatus may receive a reconfigurable intelligent surface (RIS) pattern configuration from a network entity. The apparatus may receive a diode bias voltage configuration for a plurality of diodes or a plurality of RIS elements of the network node from the network entity. The diode bias voltage configuration may be associated with the RIS pattern configuration. The apparatus may forward at least one transmission from a first device to a second device via the network node in one of an uplink, a downlink, or a sidelink based on the RIS pattern configuration and the diode bias voltage configuration.

In an aspect of the disclosure, a method, a computer-readable medium, and an apparatus are provided. The apparatus may be a network entity. The apparatus may transmit, for a network node, a RIS pattern configuration. The apparatus may transmit, for the network node, a diode bias voltage configuration for a plurality of diodes or a plurality of RIS elements of the network node. The diode bias voltage configuration may be associated with the RIS pattern configuration. At least one transmission may be forwarded from a first device to a second device via the network node in one of an uplink, a downlink, or a sidelink based on the RIS pattern configuration and the diode bias voltage configuration.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
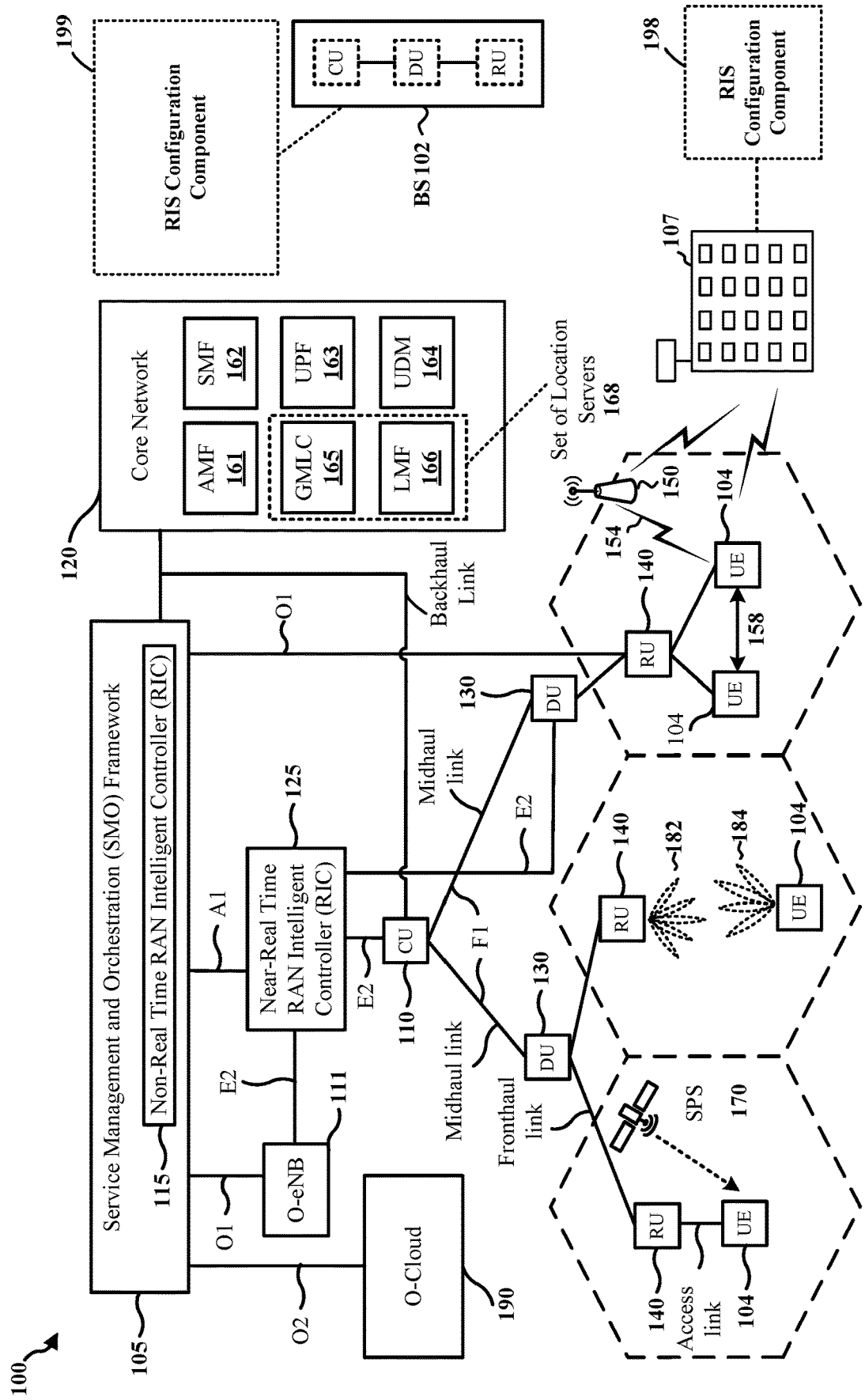
FIG. 1 is a diagram illustrating an example of a wireless communications system and an access network.

In some aspects, RIS reconfigurability may be implemented via tunable electronic components (e.g., positiveintrinsic-negative (PIN) diodes). In some configurations, each PIN diode may be tuned to either an on state ("ON") or an off state ("OFF"). The PIN diode may consume power at least when the PIN diode is in the on state. Consequently, each RIS configuration may be associated with a total power consumption dependent upon the states of the constituent electronic components (e.g., PIN diodes).

In some configurations, the RIS power draw may be continuous when the RIS is placed in a configuration where one or more diodes are in the on state. Accordingly, even if the RIS is not reconfigured, the RIS may keep consuming power to retain (or remain in) that configuration. To realize practically useful RIS deployments, further power saving techniques for the RIS may be desired.

In one or more configurations, bias voltages of PIN diodes at a RIS may be tuned. In some examples, a network entity (e.g., a base station) may transmit, for a network node (e.g., a RIS, which may include a RIS controller), a RIS pattern configuration. The network entity may transmit, for the network node, a diode bias voltage configuration for a plurality of diodes or a plurality of RIS elements of the network node. The diode bias voltage configuration may be associated with the RIS pattern configuration. The network node may forward at least one transmission from a first device to a second device via the network node in one of an uplink, a downlink, or a sidelink based on the RIS pattern configuration and the diode bias voltage configuration. Accordingly, the power consumption of the RIS may be substantially reduced, while an acceptable level of RIS performance may be maintained.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit wireless signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit—User Plane (CU-UP)), control plane functionality (i.e., Central Unit—Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to YMHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the network node 107 (e.g., a RIS) may have a RIS configuration component 198 that may be configured to receive a RIS pattern configuration from a network entity. The RIS configuration component 198 may be configured to receive a diode bias voltage configuration for a plurality of diodes or a plurality of RIS elements of the network node from the network entity. The diode bias voltage configuration may be associated with the RIS pattern configuration. The RIS configuration component 198 may be configured to forward at least one transmission from a first device to a second device via the network node in one of an uplink, a downlink, or a sidelink based on the RIS pattern configuration and the diode bias voltage configuration. In certain aspects, the base station 102 may have a RIS configuration component 199 that may be configured to transmit, for a network node, a RIS pattern configuration. The RIS configuration component 199 may be configured to transmit, for the network node, a diode bias voltage configuration for a plurality of diodes or a plurality of RIS elements of the network node. The diode bias voltage configuration may be associated with the RIS pattern configuration. At least one transmission may be forwarded from a first device to a second device via the network node in one of an uplink, a downlink, or a sidelink based on the RIS pattern configuration and the diode bias voltage configuration.

Figure 2:
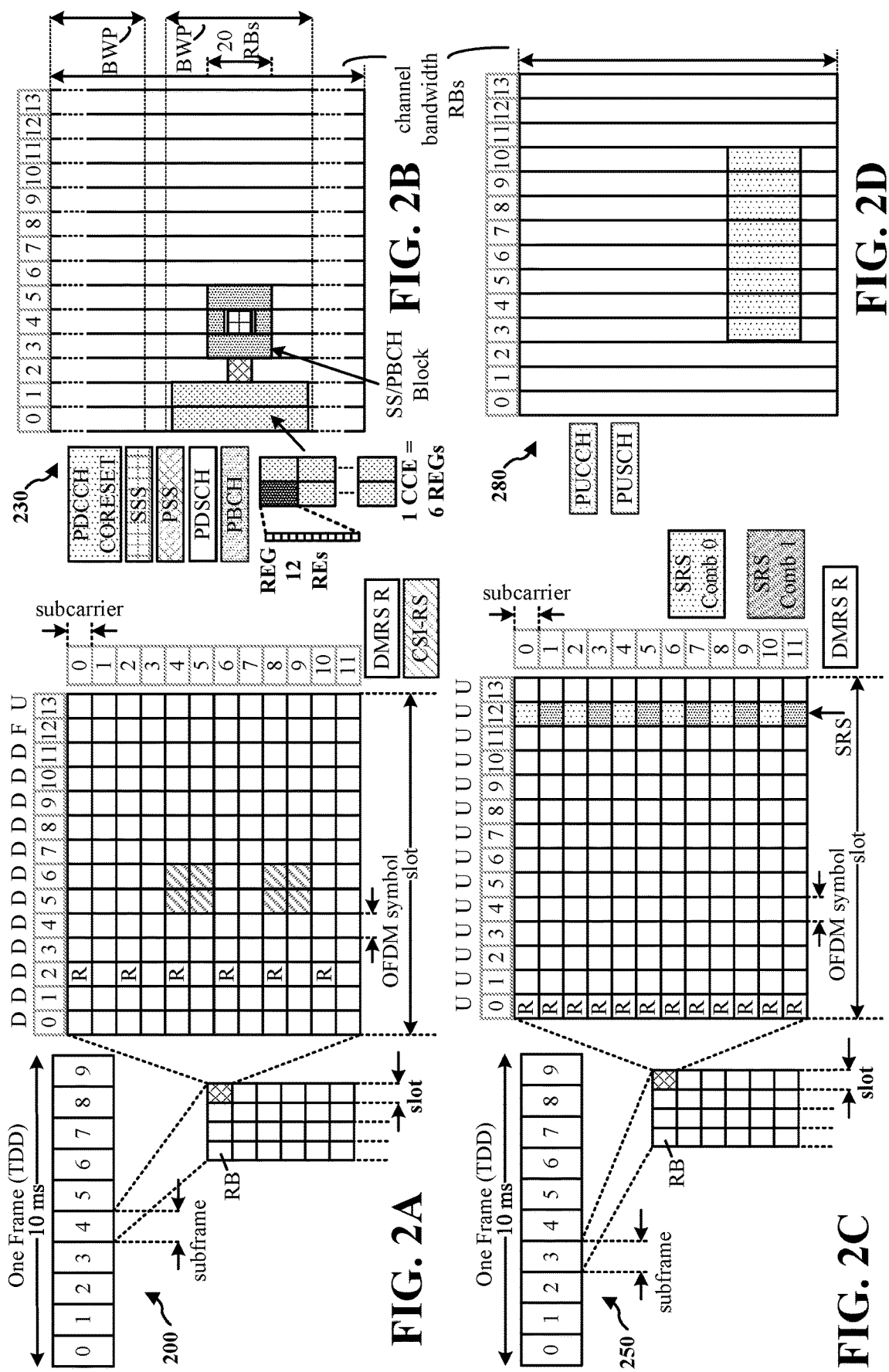
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15$[kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and 29 slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
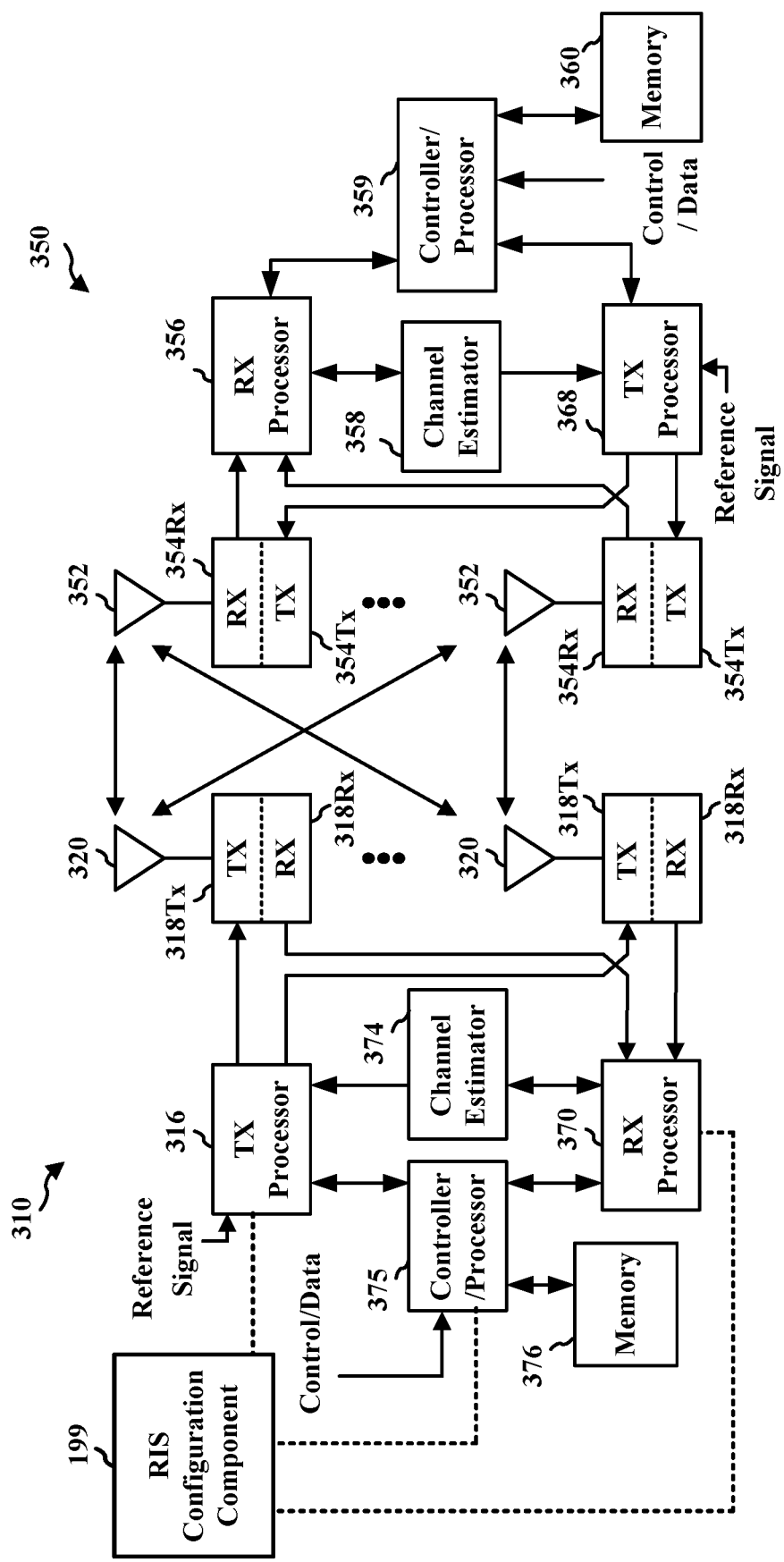
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the ULE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 316, the RX processor 370, and the controller/processor 375 may be configured to perform aspects in connection with the RIS configuration component 199 of FIG. 1.

In some aspects, wireless communications may be aided by one or more RISs. An example RIS may include an array of passive and reconfigurable reflecting elements. Accordingly, a RIS may boost network coverage and/or improve spectral efficiency (e.g., by creating new multipaths) at a low deployment cost. In some examples, the reconfigurability of a RIS may allow a network entity (e.g., a base station) to optimize the operation of the RIS in order to assist a particular network-selected group of UEs by enhancing the end-to-end channel seen by those UEs. Assisting such a network-selected group of UEs may be one of the key features of the RIS.

In some aspects, RIS reconfigurability may be implemented via tunable electronic components (e.g., PIN diodes). In some configurations, each PIN diode may be tuned to either an on state or an off state. The PIN diode may consume power at least when the PIN diode is in the on state. Consequently, each RIS configuration may be associated with a total power consumption dependent upon the states of the constituent electronic components (e.g., PIN diodes).

In some configurations, the RIS power draw may be continuous when the RIS is placed in a configuration where one or more diodes are in the on state. Accordingly, even if the RIS is not reconfigured, the RIS may keep consuming power to retain (or remain in) that configuration. In some examples, the average power consumption of a 20×20 PIN diode array-based RIS may be approximately 8 W. To realize practically useful RIS deployments, further power saving techniques for the RIS may be desired.

In one or more configurations, bias voltages of PIN diodes at a RIS may be tuned in order to substantially reduce the power consumption of the RIS, while maintaining an acceptable level of RIS performance.

Because the on state at a PIN diode is associated with a higher current flow through the diode, the power consumed by the PIN diode may be significantly higher when the PIN diode is in the on state than when the PIN diode is in the off state. Further, the power consumed by a PIN diode when the PIN diode is in the on state may be directly proportional to the bias voltage applied to the PIN diode. Therefore, reducing the bias voltage may directly reduce the power consumption at the PIN diode.

For a given incident signal power, there may be tradeoffs involved in reducing the bias voltage of the PIN diode. For example, reducing the bias voltage may cause an increase in signal loss due to leakage. Further, reducing the bias voltage may also cause an increase in intermodulation products or non-linearities. Therefore, reducing the bias voltage may directly reduce the power consumption at the PIN diode, but at the cost of increased (signal) degradation (e.g., increased distortions or non-linearities).

Moreover, the incident power may have an effect upon (signal) loss and/or distortions/non-linearities. In particular, for a given bias voltage, increasing the incident power may cause an increase in signal loss due to leakage. Further, increasing the incident power may cause an increase in intermodulation products or non-linearities. Accordingly, as the incident power increases, the bias voltage may need to be sufficiently high in order to keep non-linearities under an acceptable level (e.g., a threshold).

Figure 4:
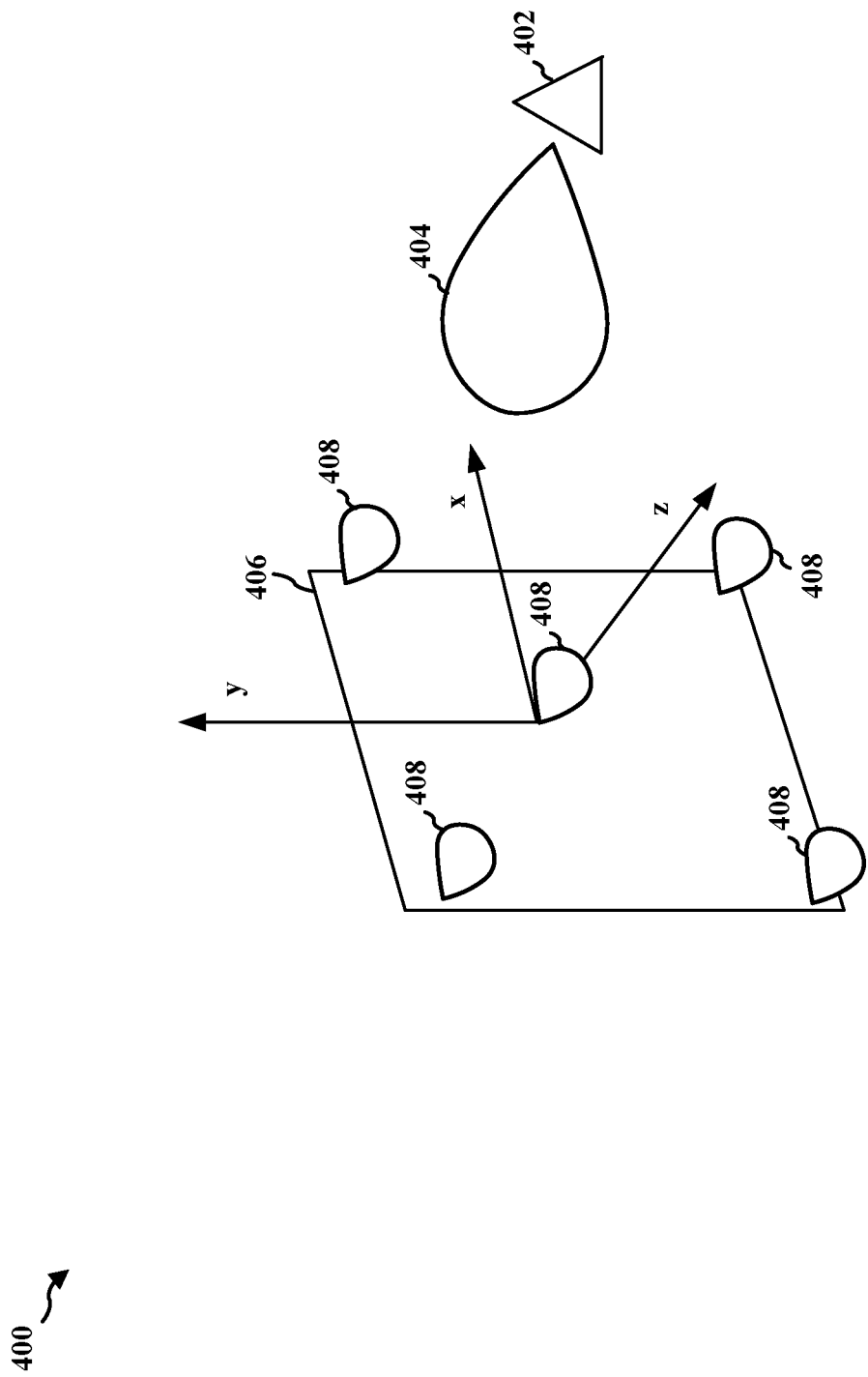
FIG. 4 is a diagram illustrating example non-uniform illumination of a RIS array.

FIG. 4 is a diagram 400 illustrating example non-uniform illumination of a RIS array. As shown, a source transmitter 402 may transmit signals toward a RIS 406 via a transmit beam 404. At the RIS 406, each RIS element (or RIS element group) may be associated with a radiation pattern 408. In one or more configurations, a RIS element (which may also be referred to as a unit cell of the RIS) may include or may be associated with one or more PIN diodes. Accordingly, in one or more configurations, a common bias voltage may be applied to PIN diodes that are in the on state in a same RIS element. In one or more configurations, a RIS element may be considered to be in the on state if at least one PIN diode associated with the RIS element is in the on state, and may be considered to be in the off state if all PIN diodes associated with the RIS element are in the off state. In general, the incident power on a RIS element (or a RIS element group) may depend on a number of factors. For example, the factors may include 1) the distance between the source transmitter (e.g., the source transmitter 402) and the RIS element, 2) the relative orientation of the RIS (e.g., the RIS 406) with respect to the source transmitter (e.g., the source transmitter 402), 3) the transmit power at the source transmitter (e.g., the source transmitter 402), 4) the beam (e.g., associated with a width and a gain) (e.g., the beam 404) used by the source transmitter (e.g., the source transmitter 402), and/or 5) the radiation pattern (e.g., the radiation pattern 408) of the RIS element.

Accordingly, the incident power on a RIS element (or RIS element group) may have a large dynamic range. The dynamic range may be especially large for a large RIS. Using a common bias voltage for the PIN diodes in all RIS elements (e.g., as determined based on the highest possible incident power across all RIS elements) may be overly conservative, and may be associated with higher RIS power consumption.

The bias voltages for the PIN diodes may be selected based on one or more strategies. In one example, a tailored but static setting of the bias voltages may reduce the RIS power consumption by 50% in a PIN diode array-based 20×20 binary-RIS operating at 28 GHz. However, such a static setting may be suitable just for the single scenario for which it has been tailored. The static setting may not be suitable for practical operation where a dynamic range of scenarios may be encountered at the RIS.

Figure 5:
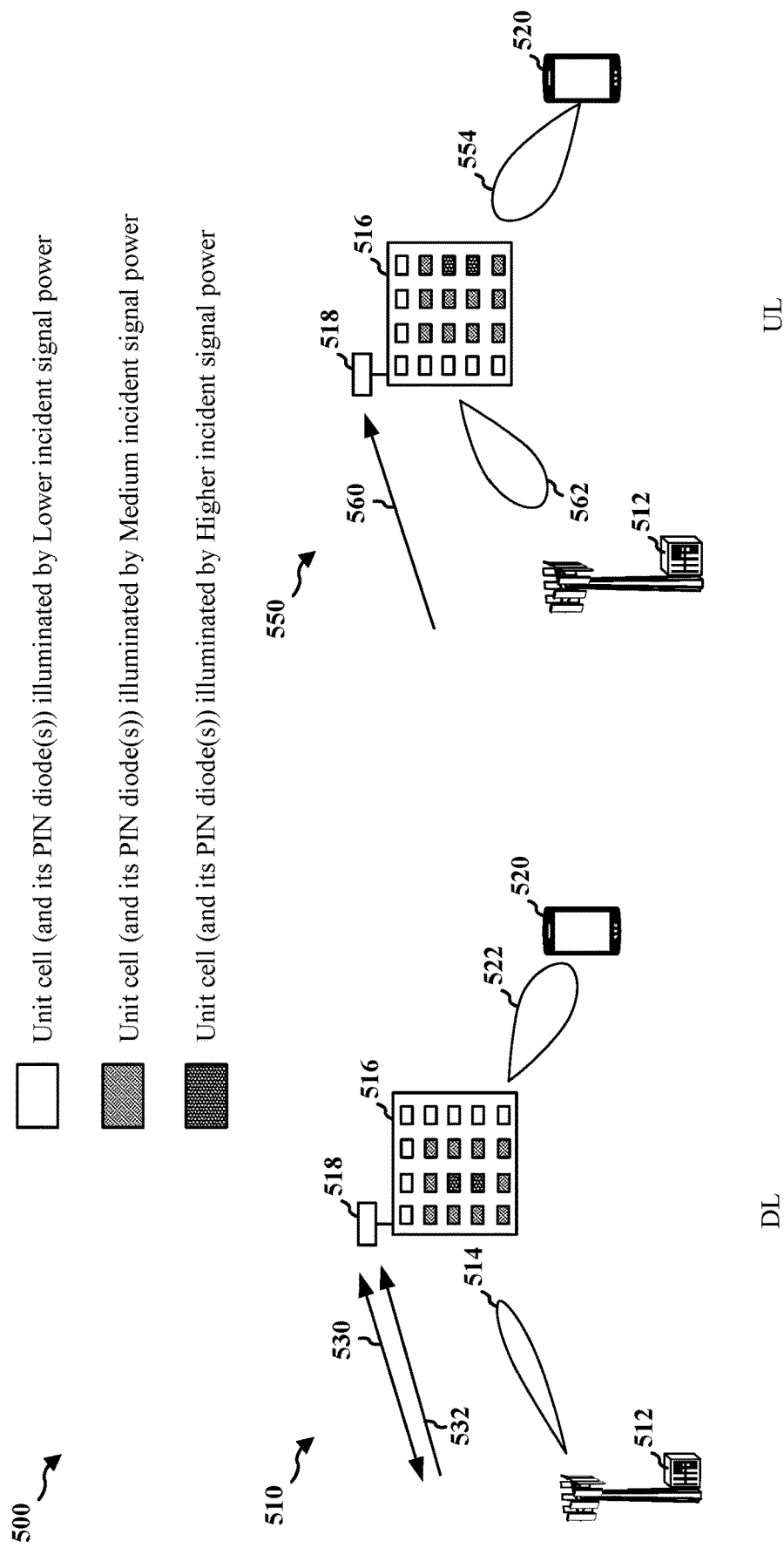
FIG. 5 is a diagram illustrating example RIS-assisted communications with optimized bias voltage configuration.

FIG. 5 is a diagram 500 illustrating example RIS-assisted communications with optimized bias voltage configuration. Each PIN diode of the RIS array may be in either the on state or the off state. The on state of a PIN diode may be achieved by, e.g., applying a sufficiently high positive bias voltage to the anode of the diode (or by applying a negative bias voltage with a sufficiently large absolute voltage value to the cathode of the diode). Further, the off state of a PIN diode may be achieved by removing or reversing the bias voltage.

Using optimized bias voltages for all PIN diodes may bring about a significant reduction in the RIS power consumption while yielding an acceptable level of RIS performance.

The diagram 510 shows an example RIS-assisted downlink communication. As shown in the diagram 510, an example RIS may include a RIS array 516 and a RIS controller 518. During the initial setup 530, the RIS controller 518 may report the capabilities of the RIS to a network entity (e.g., a base station) (which may or may not be the base station 512) via a control link. Further, the network entity and the RIS controller 518 may exchange the bias voltage codebook information via the control link. Then, for the RIS operation associated with the downlink communication, at 532, the network entity may indicate, to the RIS controller 518 via the control link, the RIS pattern to be used and the bias voltage setting to be applied. For example, the bias voltage setting may include a codeword in the bias voltage codebook. The RIS pattern and the bias voltage setting may be associated with a downlink transmission from the base station 512 to the UE 520. In particular, the RIS pattern and the bias voltage setting may be based at least in part on the non-uniform illumination of the RIS array 516 by the incident signal from the base station 512 (e.g., as shown in the diagram 510, the incident signal power may be high, medium, or low at different RIS elements at the RIS array 516). Thereafter, the base station 512 may transmit one or more signals toward the RIS array 516 via the beam 514. In particular, the base station 512 may steer the main lobe (e.g., the lobe containing the highest power) of the beam 514 toward the RIS array 516 based on the beamforming technique. Further, based on the active RIS pattern, the RIS array 516 may reflect the signals from the base station 512 toward the UE 520 via the beam 522.

Moreover, the diagram 550 shows an example RIS-assisted uplink communication. As shown in the diagram 550, for the RIS operation associated with the uplink communication, at 560, the network entity may indicate, to the RIS controller 518 via the control link, the RIS pattern to be used and the bias voltage setting to be applied. For example, the bias voltage setting may include a codeword in the bias voltage codebook. The RIS pattern and the bias voltage setting may be associated with an uplink transmission from the UE 520 to the base station 512. In particular, the RIS pattern and the bias voltage setting may be based at least in part on the non-uniform illumination of the RIS array 516 by the incident signal from the UE 520 (e.g., as shown in the diagram 550, the incident signal power may be high, medium, or low at different RIS elements at the RIS array 516). Thereafter, the UE 520 may transmit one or more signals toward the RIS array 516 via the beam 554. In particular, UE 520 may steer the main lobe of the beam 554 toward the RIS array 516 based on the beamforming technique. Further, based on the active RIS pattern, the RIS array 516 may reflect the signals from the UE 520 toward the base station 512 via the beam 562.

Figure 6:
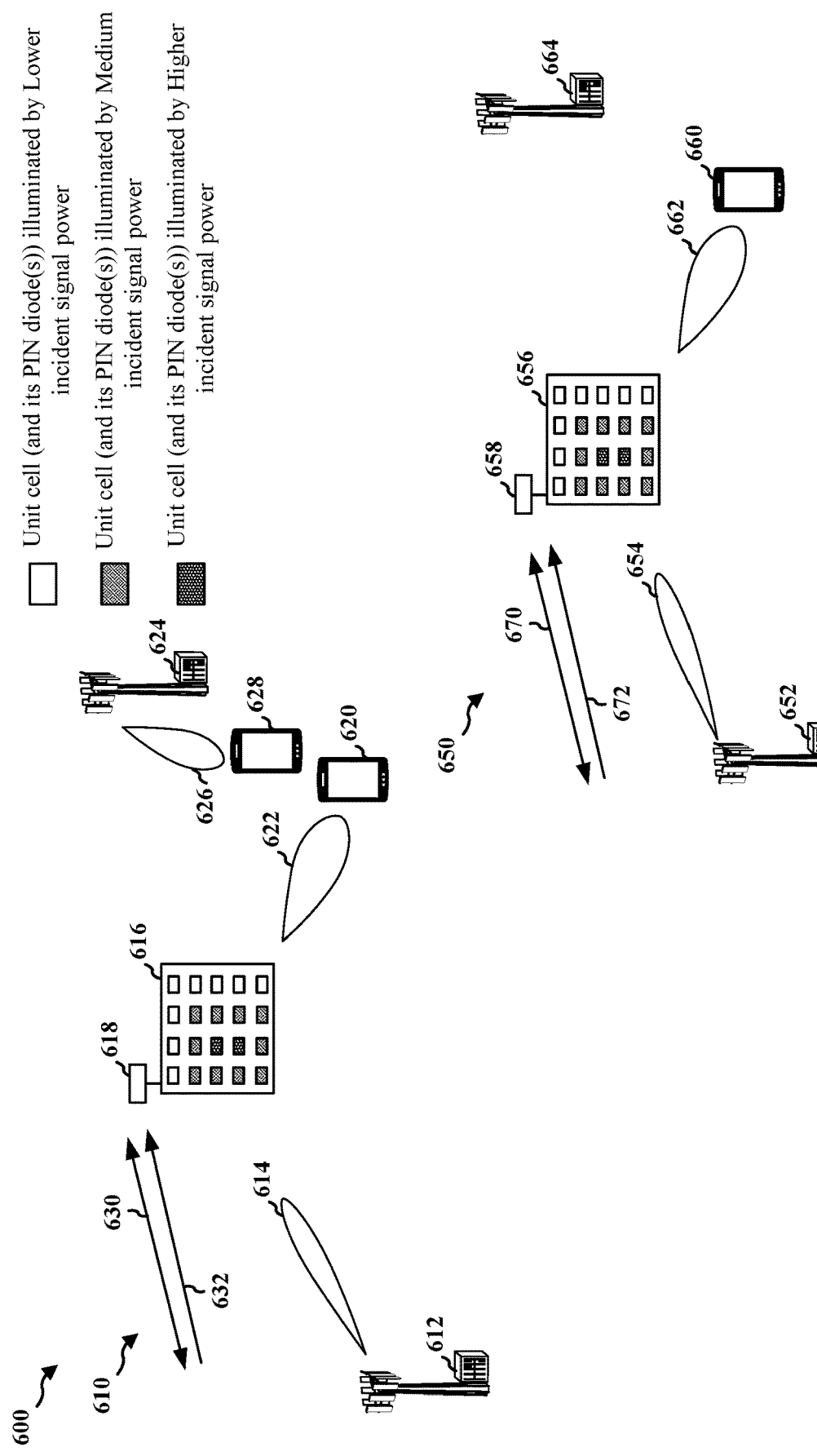
FIG. 6 is a diagram illustrating example RIS-assisted communications with optimized bias voltage configuration.

FIG. 6 is a diagram 600 illustrating example RIS-assisted communications with optimized bias voltage configuration. As shown in the diagram 610, the RIS array 616, the RIS controller 618, the base station 612, the beam 614, the UE 620, and the beam 622 may be similar to the RIS array 516, the RIS controller 518, the base station 512, the beam 514, the UE 520, and the beam 522 in FIG. 5, respectively. Further, 630 and 632 may be similar to 530 and 532 in FIG. 5, respectively. Accordingly, the base station 612 may transmit one or more signals toward the RIS array 616 via the beam 614. Further, based on the active RIS pattern, the RIS array 616 may reflect the signals from the base station 612 toward the UE 620 via the beam 622.

Furthermore, as shown in the diagram 610, the UE 620 may experience a high level of interference from the signal transmitted from the base station 624 to the UE 628 via the beam 626 as the beam 626 may point toward the UE 620. As a result, due to the high level of interference at the UE 620, there may be a lower margin to accommodate the signal loss and/or non-linearities at the RIS that may be introduced due to the reduction in the bias voltage.

Further, as shown in the diagram 650, the RIS array 656, the RIS controller 658, the base station 652, the beam 654, the UE 660, and the beam 662 may be similar to the RIS array 616, the RIS controller 618, the base station 612, the beam 614, the UE 620, and the beam 622 in the diagram 610, respectively. Further, 670 and 672 may be similar to 630 and 632 in the diagram 610, respectively. Accordingly, the base station 652 may transmit one or more signals toward the RIS array 656 via the beam 654. Further, based on the active RIS pattern, the RIS array 656 may reflect the signals from the base station 652 toward the UE 660 via the beam 662.

However, in contrast to the UE 620, the UE 660 may experience a limited or low level of interference from the base station 664 as the base station 664 may not transmit any signal via a beam that may point toward the UE 660. As a result, due to the low level of interference at the UE 660, there may be a higher margin to accommodate the signal loss and/or non-linearities at the RIS that may be introduced due to the reduction in the bias voltage.

Figure 7:
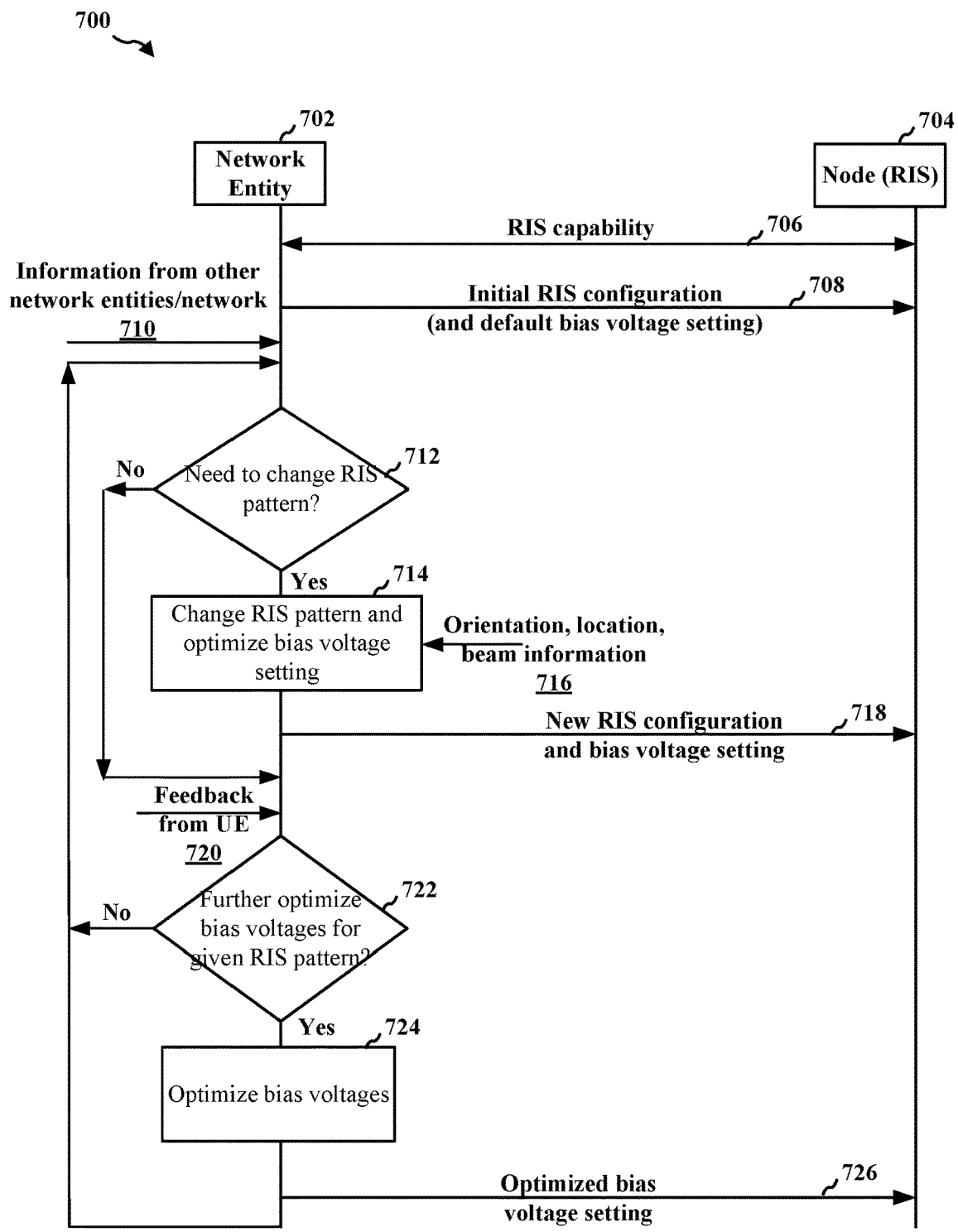
FIG. 7 is a diagram illustrating a flowchart of a method of setting optimized bias voltages.

FIG. 7 is a diagram illustrating a flowchart of a method 700 of setting optimized bias voltages. The network entity 702 (e.g., a base station) may initially select a RIS pattern (or configuration) for the network node 704 (e.g., a RIS) that may correspond to a pair of incident and reflected directions such that the RIS pattern may maximize the gain at the reflected direction for the incident direction. The network entity 702 may also initially select a default bias voltage setting for the network node 704. At 706, the network node 704 may exchange RIS capability information with the network entity 702. In particular, the RIS capability information may include a range for bias voltage adaptation.

In one or more configurations, the RIS configuration may be subsequently changed due to one or more reasons. For example, the RIS configuration may be changed because the desired (network-chosen) UE(s) that are to be assisted by the RIS may have changed based on the scheduling decision. For another example, the RIS configuration may be changed because the served UE may be moving, which may reduce the main lobe gain of the reflected signal as perceived by the served UE. For yet another example, the RIS configuration may be changed because the network topology may be changing due to scenarios associated with some other UEs (e.g., newly active UEs, existing UEs in motion, etc.) and the initial RIS configuration may now cause unacceptably high interference to these other UEs. For yet another example, the RIS configuration may be changed because the source transmitter (e.g., a base station or a UE) may change the transmit beam to accommodate new interference constrains and the changed transmit beam may cause the incident signal direction at the RIS to change as well.

In one or more configurations, the RIS configuration may be changed based on one or more triggering conditions. One example triggering condition may be that the base station may be to serve another set of UE(s). Another example triggering condition may be that the base station may infer based on the feedback from served UEs that the main lobe gain associated with the current RIS configuration is not sufficiently high. Yet another example triggering condition may be that the base station may learn, from the network, new protected directions along which interference may need to be limited and the protected directions may correspond to the reflection from the RIS or the transmission from the base station. In some examples, the base station may learn the new protected directions based on a network response that is provided in response to a query transmitted by the base station to the network. Yet another example triggering condition may be that the base station may proactively direct the RIS to sweep across a set of configurations, and may then evaluate the interference reports collected based on each of the configurations.

In one or more configurations, the bias voltages may be reoptimized for a new RIS configuration. In one or more further configurations, an example triggering condition associated with updating the bias voltage setting for a same (unchanged) RIS configuration may be that the base station may infer based on feedback from the served UE that the interference condition perceived by the served UE has changed.

In one or more configurations, the network entity 702/network may reconfigure the network node 704 with a configuration selected from a RIS configuration codebook. In one or more configurations, the RIS configuration codebook may include RIS configurations (which may include RIS patterns, and may correspond to codewords) associated with different reflected signal main lobe peak directions for one or more incident signal directions. In addition or in the alternative, the RIS configurations may be associated with different reflected signal sidelobe (i.e., a lobe that is not the main lobe) profiles.

Therefore, in one or more configurations, the RIS configuration selection may be aimed at improving the reflected main lobe gain towards a desired receiver. In one or more configurations, the RIS configuration selection may be aimed at lowering the sidelobe gain towards unintended receivers (i.e., devices for which interference reduction may be specified) while keeping a sufficiently high main lobe gain towards the desired receiver.

In one or more configurations, the network entity 702/network may adjust the RIS bias voltage setting at the network node 704. In some configurations, the new RIS bias voltage setting may be selected form a RIS bias voltage configuration codebook. In some configurations, the RIS bias voltage configuration codebook may be separate from the RIS configuration codebook described above. In some configurations, the RIS bias voltage configuration codebook and the RIS configuration codebook described above may be incorporated into a same codebook.

In one or more configurations, the bias voltages may be reoptimized for a new RIS configuration because the set of diodes in the on state may have changed. In one or more configurations, to account for the non-uniform illumination of the RIS array by the incident signal, the bias voltage optimization may be based on one or more of the relative orientation and location of the RIS, the location of the source transmitter, the source transmitter beam pointing (peak) direction, the source transmitter beam width, and/or the source transmitter beam peak gain. In different configurations, the source transmitter may be the base station in the downlink or the UE in the uplink or the sidelink.

In one or more configurations, for a given unchanged RIS configuration, there may be further opportunities to update the bias voltages if the served UE reports changes in interference perceived by the served UE. Such changes in the perceived interference may impact the signal-to-interference-plus-noise ratio (SINR) at the served UE and hence the margin of tolerance the served UE has for non-linearities that may be introduced due to lower bias voltage settings.

Accordingly, at 706, the network entity 702 and the network node 704 may exchange the RIS capability information associated with the network node 704. At 708, the network entity 702 may transmit, for the network node 704, the initial RIS configuration. In some configurations, at 708, the network entity 702 may also transmit, for the network node 704, the default bias voltage setting.

At 710, the network entity 702 may revive information from other network entities or from the network. At 712, the network entity 702 may identify whether the RIS pattern needs to be changed (e.g., based on the information received at 710). If the network entity 702 determines that the RIS pattern needs to be changed, at 714, based on the orientation, location, and beam information 716, the network entity 702 may select a new RIS pattern and a new (optimized) bias voltage setting for the new RIS pattern. At 718, the network entity 702 may transmit, for the network node 704, the new RIS configuration and the new bias voltage setting.

If the network entity 702 determines, at 712, that the RIS pattern does not need to be changed, or following 718, at 720, the network entity 702 may receive feedback information from the UE. At 722, the network entity 702 may identify whether the bias voltages may be further optimized given the currently active RIS pattern configuration. If the network entity 702 determines that the bias voltages may be further optimized, at 724, the network entity 702 may identify the new (optimized) bias voltage setting. Then, at 726, the network entity 702 may transmit, for the network node 704, the new optimized bias voltage setting.

In one or more configurations, a network entity (e.g., the network entity 702, a base station) may indicate the optimized bias voltage setting selection to the RIS controller in one or more fashions. For example, in one or more configurations, the network entity may indicate the bias voltages on a per RIS element (control) group basis. In particular, the RIS elements may be (logically) partitioned into multiple groups (sub-arrays). Then, a common bias voltage may be set, indicated, and used for all PIN diodes in a RIS element group. In one special case, the RIS elements may include just one group, and a common bias voltage may be indicated and applied for all PIN diodes that are in the on state. In different configurations, a RIS element may be considered to be in the on state if at least one PIN diode associated with the RIS element is in the on state.

In one or more configurations, a mask may be used in the indication of the bias voltage setting. For example, in one configuration, a binary {0, 1} (or {L, H}, etc.) mask covering all RIS elements may be indicated. The network entity may separately indicate a first voltage value for a low bias voltage and a second voltage value for a high bias voltage. For example, if the mask value for the n-th RIS element is 0 (or low (L)), then the low bias voltage may be applied for the PIN diodes in the on state and corresponding to the n-th RIS element. Further, if the mask value for the n-th RIS element is 1 (or high (H)), then the high bias voltage may be applied for the PIN diodes in the on state and corresponding to the n-th RIS element. Of course, in some other example configurations, the mask values 0 and 1 may have different or the opposite meanings from those described above.

In another example, a ternary {L, M, H} mask covering all elements may be indicated. The network node may separately indicate a first voltage value for a low (L) bias voltage, a second voltage value for a medium (M) bias voltage, and a third voltage value for a high (H) bias voltage.

If the mask value for the n-th RIS element is L, then the low bias voltage may be applied for the PIN diodes in the on state and corresponding to the n-th RIS element. Further, if the mask value for the n-th RIS element is M, then the medium bias voltage may be applied for the PIN diodes in the on state and corresponding to the n-th RIS element. Moreover, if the mask value for the n-th RIS element is H, then the high bias voltage may be applied for the PIN diodes in the on state and corresponding to the n-th RIS element.

In one or more configurations, the network entity (e.g., the base station) may indicate the bias voltage configuration to the RIS controller based on one or more bias voltage differences/differentials. In one or more configurations, for a new or updated RIS configuration, bias voltages may be indicated for all diodes that are in the on state (or RIS elements that are in the on state in case of a binary-RIS), where an absolute bias voltage value (e.g., a base value) may be indicated for one of the RIS elements and differences from the indicated absolute bias voltage value may be indicated for the rest of the RIS elements that have diodes in the on state. In a particular example, the position (identity) of the RIS element with the highest (or lowest) corresponding diode bias voltage value may be indicated. The highest (or lowest) corresponding diode bias voltage value may be indicated as an absolute value. Then, bias voltages corresponding to the remaining RIS elements with diodes in the on state may be indicated (conveyed) in a differential manner. In particular, for each of the remaining RIS elements, the difference between the bias voltage for the RIS element and the bias voltage for the preceding RIS element may be quantized and indicated. In one or more configurations, the order of the remaining RIS elements (i.e., the order in which the bias voltages for the remaining RIS elements are indicated) may be based on any suitable predetermined configuration or rule.

In one or more additional configurations, a common base bias voltage value (e.g., quantized to a certain (finer) resolution) may be first indicated for all diodes in the on state. Then, for each diode in the on state, a differential value (i.e., a difference) from the common base value may be quantized (e.g., up to a coarser resolution than that for the common base value) and indicated. In one or more configurations, the indication of the bias voltage values in the differential manner as described above may be implemented on a per-RIS element group basis.

In one or more configurations, when the bias voltage setting is to be updated while the same RIS configuration is to be used without change, because the positions of the diodes in the on state remain unchanged, the updated bias voltage value for each of the diodes in the on state may be indicated based on the different from the respective previous bias voltage value (e.g., after quantization). In one or more configurations, the indication of the updated bias voltage setting for an unchanged RIS configuration in the differential manner as described above may be implemented on a per-RIS element group basis.

In one or more configurations, a RIS may autonomously set the bias voltages for the PIN diodes. In other words, when the RIS is operating in the autonomous bias voltage setting mode, the bias voltage values may be set autonomously by the RIS (or the RIS controller). In one or more configurations, the actual bias voltage setting applied by the RIS controller while the RIS is in the autonomous mode may be dependent upon the RIS (pattern) configuration and/or the available RIS power budget. In one or more configurations, a network entity (e.g., a base station) may transmit an indication to the RIS controller to enable the autonomous setting of bias voltages at the RIS. In one or more configurations, when the RIS is operating in the autonomous mode, the RIS controller may not share implementation details and/or the available power budget information with the network entity. In one or more configurations, the network entity may transmit an indication/signal to the RIS controller to grant permission for the autonomous bias voltage setting mode. The indication/signal may further include a duration for which the permission is valid. Accordingly, if the indication/signal includes a validity duration, the RIS controller may exit the autonomous bias voltage setting mode, and may revert to applying the bias voltage setting based on the indication from the network entity upon the expiration of the validity duration.

As described above, the actual bias voltage setting applied by the RIS controller while the RIS is in the autonomous mode may be dependent upon the RIS configuration and/or the available RIS power budget. In one or more configurations, the bias voltage setting applied by the RIS controller may be based on an intended receive interference/distortion margin (with either a UE or a base station as the receiving device). In some configurations, the network entity may indicate the intended interference/distortion margin to the RIS controller. More generally, the RIS may support multiple autonomous bias voltage setting modes, where each autonomous bias voltage setting mode may be associated with a corresponding maximum level of introduced distortion (or non-linearities) in the RIS reflected signal. During the RIS capability information exchange with the network entity, the RIS controller may report the supported autonomous bias voltage setting modes including the corresponding maximum levels of introduced distortion (or non-linearities) to the network entity. Then, the network entity may select one of the supported autonomous bias voltage setting modes, and may transmit an indication to the RIS controller to activate the network entity-selected autonomous bias voltage setting mode. Each supported autonomous bias voltage setting mode may be associated with a set of activated PIN diodes (i.e., PIN diodes in the on state) and the corresponding bias voltage settings for the diodes in the on state. However, in some configurations, the RIS controller may not reveal the implementation detail of the autonomous bias voltage setting mode to the network entity.

Figure 8:
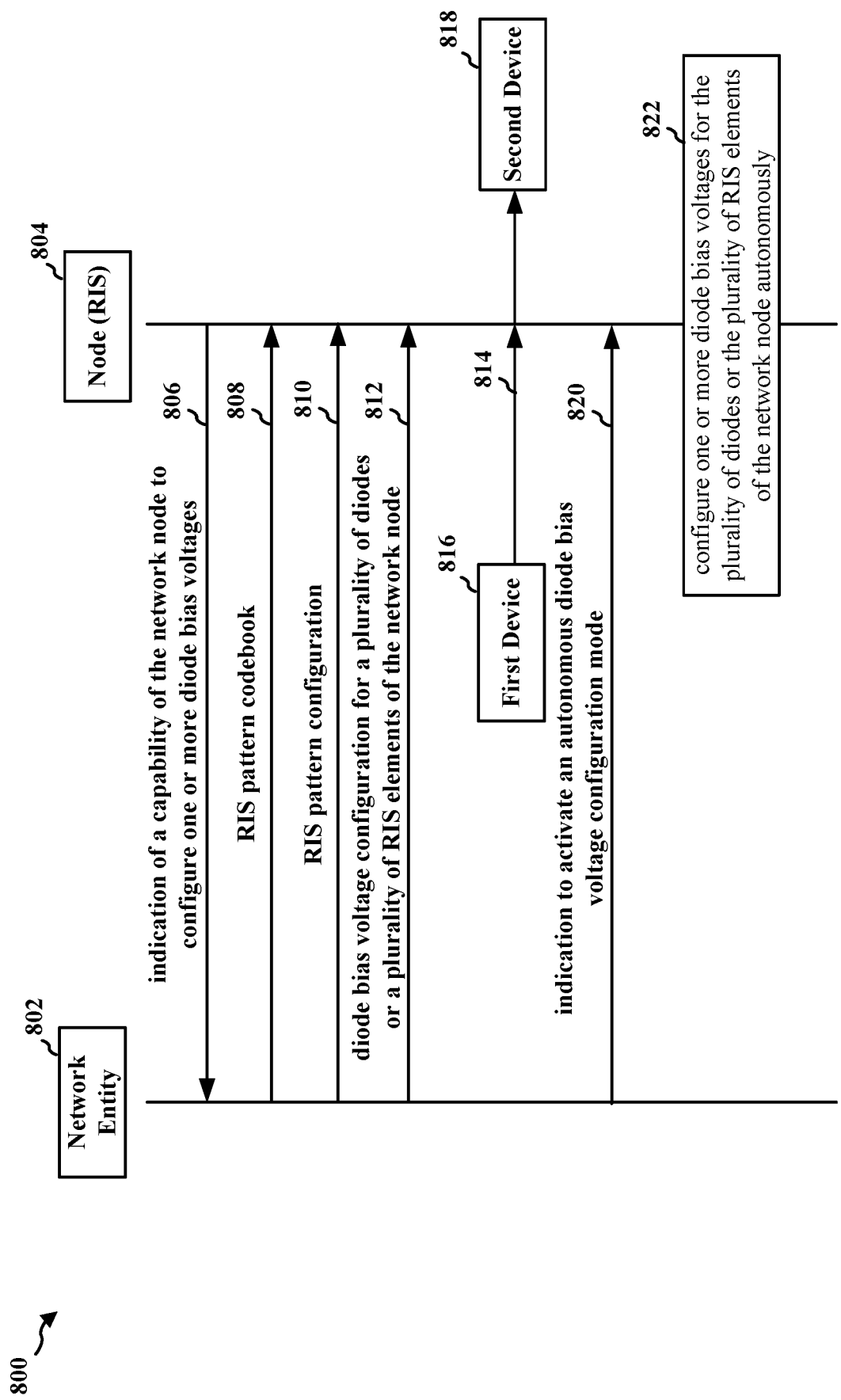
FIG. 8 is a diagram of a communication flow of a method of wireless communication.

FIG. 8 is a diagram of a communication flow 800 of a method of wireless communication. The network entity 802 may implement aspects of the base station 102/310 or the network entity 702. The network node 804 may implement aspects of the RIS 107/402/512/552/612/652 or the network node 704. At 806, the network node 804 may transmit, for the network entity 802, an indication of a capability of the network node 804 to configure one or more diode bias voltages.

At 808, the network entity 802 may transmit, for the network node 804, a RIS pattern codebook. The RIS pattern codebook at 808 may include a plurality of RIS pattern codewords. Each RIS pattern codeword in the plurality of RIS pattern codewords may correspond to a respective usable RIS pattern configuration of a plurality of usable RIS pattern configurations. Each usable RIS pattern configuration in the plurality of usable RIS pattern configurations may be associated with a reflected signal main lobe profile or one or more reflected signal sidelobe profiles.

At 810, the network entity 802 may transmit, for the network node 804, a RIS pattern configuration.

In one configuration, the RIS pattern configuration at 810 may correspond to a codeword in the RIS pattern codebook at 808. In other words, the RIS pattern configuration at 810 may be one of the plurality of usable RIS pattern configurations.

In one configuration, the RIS pattern configuration may be based on at least one of: a change of the first device 816, a change of the second device 818, a change of a location of the first device 816, a change of a location of the second device 818, a change in a network topology, an indication that a gain at the second device 818 is less than a threshold, an indication of one or more protected directions, a change in the one or more protected directions, or a configuration sweep indicated by the network entity 802.

At 812, the network entity 802 may transmit, for the network node 804, a diode bias voltage configuration for a plurality of diodes or a plurality of RIS elements of the network node 804. The diode bias voltage configuration may be associated with the RIS pattern configuration at 810.

In one configuration, the diode bias voltage configuration may be transmitted and received at 812 based on at least one of: the RIS pattern configuration at 810, a change of an interference condition at the first device 816, or a change of an interference condition at the second device 818.

In one configuration, the diode bias voltage configuration at 812 may be based on one or more of an orientation of the network node 804, a location of the network node 804, a location of the first device 816, a transmit beam direction of the first device 816, a transmit beam width of the first device 816, or a transmit beam peak gain of the first device 816.

In one configuration, the plurality of diodes or the plurality of RIS elements may include one or more groups of diodes or one or more groups of RIS elements. The diode bias voltage configuration at 812 may indicate a respective uniform bias voltage for each group of diodes or each group of RIS elements in the one or more groups of diodes or the one or more groups of RIS elements.

In one configuration, the diode bias voltage configuration at 812 may indicate a respective bias voltage selected from a preconfigured number of usable bias voltages for each diode or each RIS element that is on in the plurality of diodes or the plurality of RIS elements. The diode or the RIS element may be on based on the RIS pattern configuration at 810.

In one configuration, the diode bias voltage configuration at 812 may indicate a respective bias voltage selected from a preconfigured number of usable bias voltages for at least one diode or at least one RIS element that is on in the plurality of diodes or the plurality of RIS elements. The at least one diode or the at least one RIS element may be on based on the RIS pattern configuration at 810.

In one configuration, the diode bias voltage configuration at 812 may indicate at least one bias voltage for at least one diode or at least one RIS element that is on in the plurality of diodes or the plurality of RIS elements based on a difference between the at least one bias voltage and a reference bias voltage. The at least one diode or the at least one RIS element may be on based on the RIS pattern configuration at 810.

In one or more configurations, the reference bias voltage may be one of a bias voltage for a specified diode or RIS element, a base bias voltage, or a previous bias voltage for the at least one diode or the at least one RIS element.

At 814, the network node 804 may forward at least one transmission from the first device 816 to the second device 818 via the network node 804 in one of an uplink, a downlink, or a sidelink based on the RIS pattern configuration at 810 and the diode bias voltage configuration at 812.

In one configuration, at 820, the network entity 802 may transmit, for the network node 804, an indication to activate an autonomous diode bias voltage configuration mode.

At 822, the network node 804 may configure one or more diode bias voltages for the plurality of diodes or the plurality of RIS elements of the network node 804 autonomously based on the autonomous diode bias voltage configuration mode and one or more of the RIS pattern configuration at 810, an available RIS power budget, an interference tolerance margin at the second device 818, or a distortion tolerance margin at the second device 818.

In one configuration, the autonomous diode bias voltage configuration mode may be associated with a validity period.

In one configuration, the autonomous diode bias voltage configuration mode may be selected (e.g., by the network entity 802) from a plurality of preconfigured usable autonomous diode bias voltage configuration modes. Each preconfigured usable autonomous diode bias voltage configuration mode in the plurality of preconfigured usable autonomous diode bias voltage configuration modes may be associated with a respective maximum distortion level or a respective maximum non-linearity level.

Figure 9:
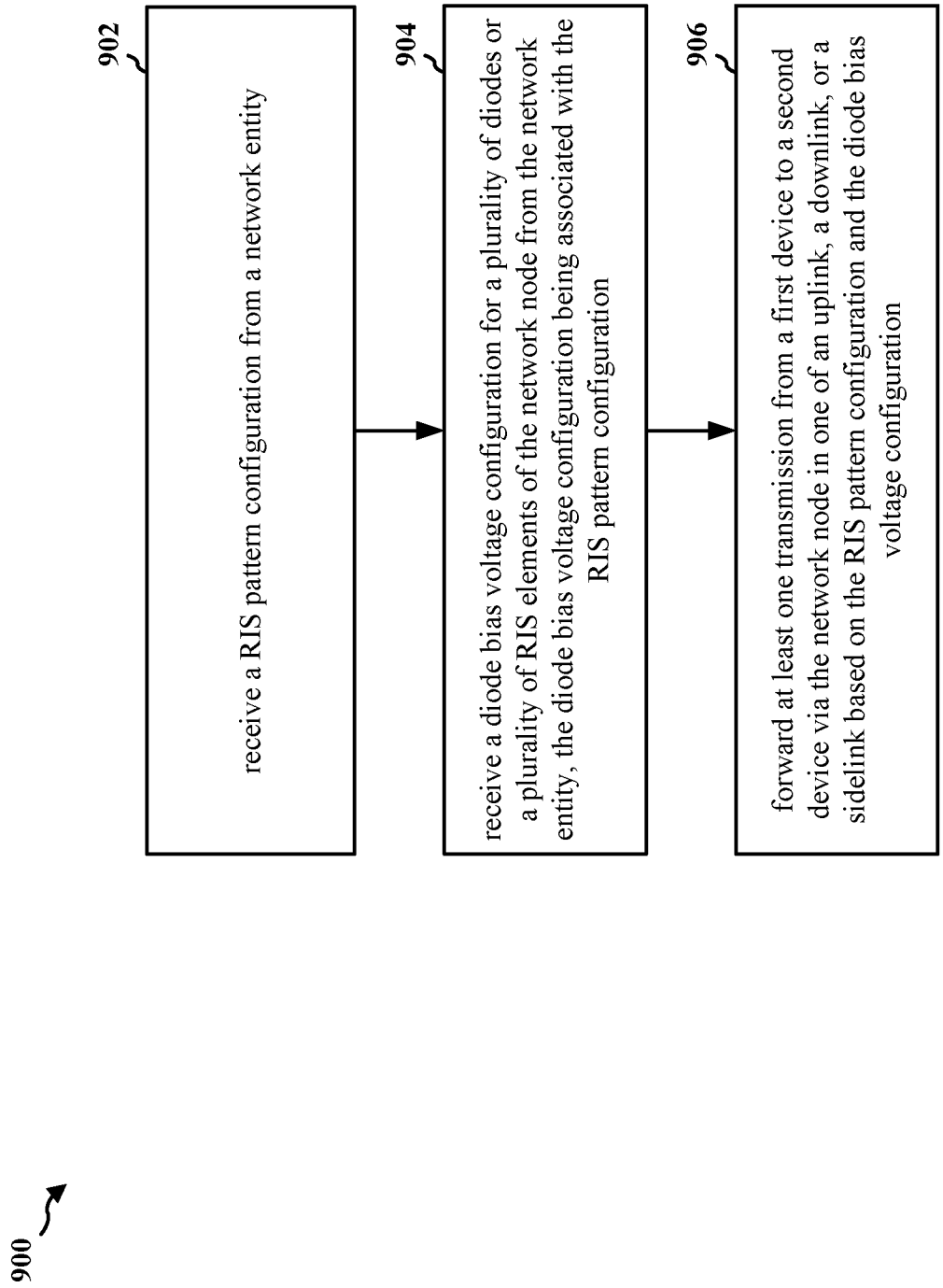
FIG. 9 is a flowchart of a method of wireless communication.

FIG. 9 is a flowchart 900 of a method of wireless communication. The method may be performed by a network node (e.g., the RIS 107/402/512/552/612/652/704/ 804; the apparatus 1460). At 902, the network node may receive a RIS pattern configuration from a network entity. For example, 902 may be performed by the component 198 in FIG. 14. Referring to FIG. 8, at 810, the network node 804 may receive a RIS pattern configuration from a network entity 802.

At 904, the network node may receive a diode bias voltage configuration for a plurality of diodes or a plurality of RIS elements of the network node from the network entity. The diode bias voltage configuration may be associated with the RIS pattern configuration. For example, 904 may be performed by the component 198 in FIG. 14. Referring to FIG. 8, at 812, the network node 804 may receive a diode bias voltage configuration for a plurality of diodes or a plurality of RIS elements of the network node 804 from the network entity 802.

At 906, the network node may forward at least one transmission from a first device to a second device via the network node in one of an uplink, a downlink, or a sidelink based on the RIS pattern configuration and the diode bias voltage configuration. For example, 906 may be performed by the component 198 in FIG. 14. Referring to FIG. 8, at 814, the network node 804 may forward at least one transmission from a first device 816 to a second device 818 via the network node 804 in one of an uplink, a downlink, or a sidelink based on the RIS pattern configuration at 810 and the diode bias voltage configuration at 812.

Figure 10:
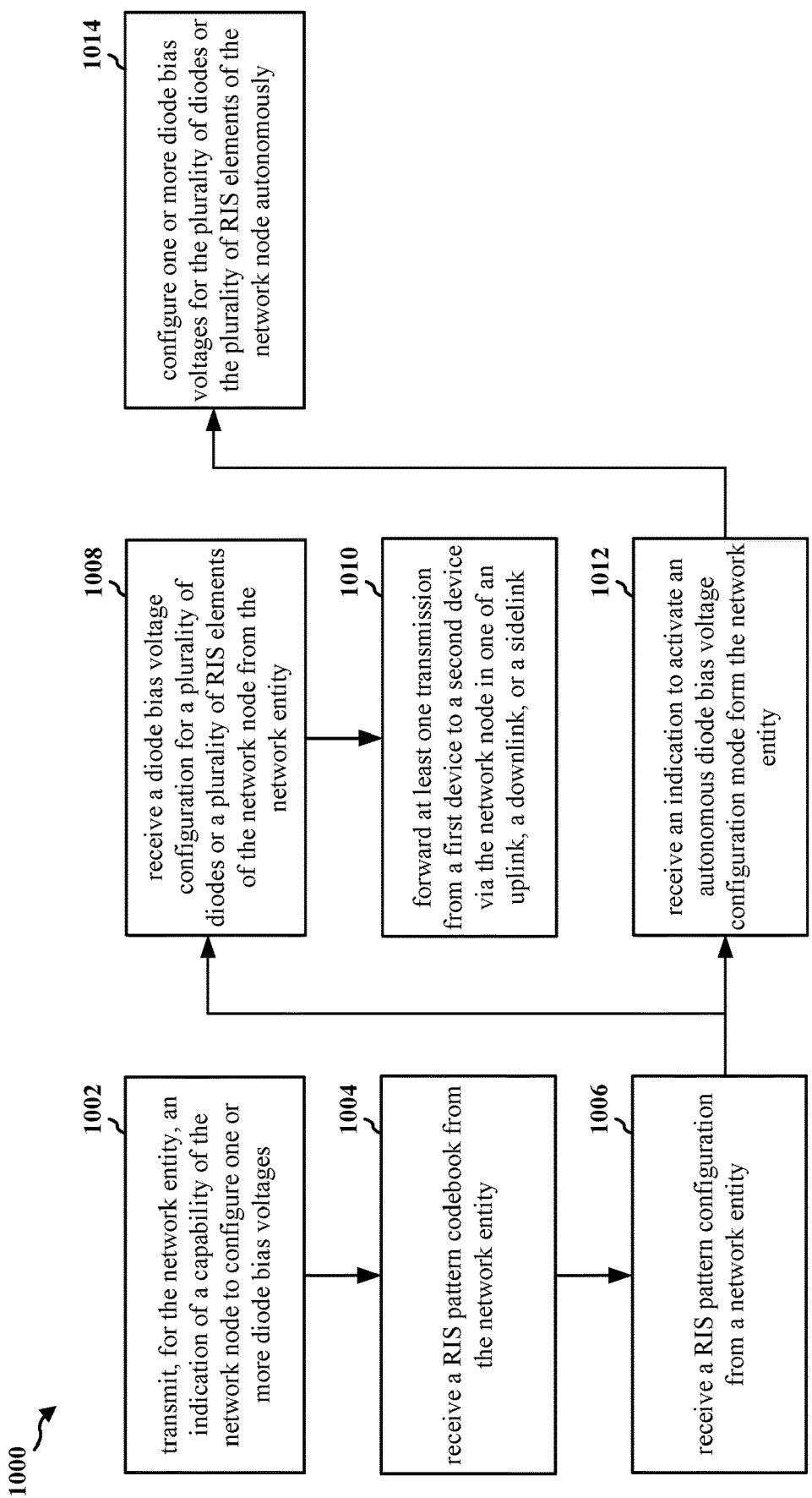
FIG. 10 is a flowchart of a method of wireless communication.

FIG. 10 is a flowchart 1000 of a method of wireless communication. The method may be performed by a network node (e.g., the RIS 107/402/512/552/612/652/704/ 804; the apparatus 1460). At 1006, the network node may receive a RIS pattern configuration from a network entity. For example, 1006 may be performed by the component 198 in FIG. 14. Referring to FIG. 8, at 810, the network node 804 may receive a RIS pattern configuration from a network entity 802.

At 1008, the network node may receive a diode bias voltage configuration for a plurality of diodes or a plurality of RIS elements of the network node from the network entity. The diode bias voltage configuration may be associated with the RIS pattern configuration. For example, 1008 may be performed by the component 198 in FIG. 14. Referring to FIG. 8, at 812, the network node 804 may receive a diode bias voltage configuration for a plurality of diodes or a plurality of RIS elements of the network node 804 from the network entity 802.

At 1010, the network node may forward at least one transmission from a first device to a second device via the network node in one of an uplink, a downlink, or a sidelink based on the RIS pattern configuration and the diode bias voltage configuration. For example, 1010 may be performed by the component 198 in FIG. 14. Referring to FIG. 8, at 814, the network node 804 may forward at least one transmission from a first device 816 to a second device 818 via the network node 804 in one of an uplink, a downlink, or a sidelink based on the RIS pattern configuration at 810 and the diode bias voltage configuration at 812.

In one configuration, referring to FIG. 8, the RIS pattern configuration at 810 may correspond to a codeword in a RIS pattern codebook at 808.

In one configuration, at 1002, the network node may transmit, for the network entity, an indication of a capability of the network node to configure one or more diode bias voltages. For example, 1002 may be performed by the component 198 in FIG. 14. Referring to FIG. 8, at 806, the network node 804 may transmit, for the network entity 802, an indication of a capability of the network node 804 to configure one or more diode bias voltages.

At 1004, the network node may receive a RIS pattern codebook from the network entity. The RIS pattern codebook may include a plurality of RIS pattern codewords. Each RIS pattern codeword in the plurality of RIS pattern codewords may correspond to a respective usable RIS pattern configuration of a plurality of usable RIS pattern configurations. Each usable RIS pattern configuration in the plurality of usable RIS pattern configurations may be associated with a reflected signal main lobe profile or one or more reflected signal sidelobe profiles. For example, 1004 may be performed by the component 198 in FIG. 14. Referring to FIG. 8, at 808, the network node 804 may receive a RIS pattern codebook from the network entity 802.

In one configuration, referring to FIG. 8, the RIS pattern configuration may be received at 810 from the network entity 802 based on at least one of: a change of the first device 816, a change of the second device 818, a change of a location of the first device 816, a change of a location of the second device 818, a change in a network topology, an indication that a gain at the second device 818 is less than a threshold, an indication of one or more protected directions, a change in the one or more protected directions, or a configuration sweep indicated by the network entity 802.

In one configuration, referring to FIG. 8, the diode bias voltage configuration may be received at 812 from the network entity 802 based on at least one of: the received RIS pattern configuration at 810, a change of an interference condition at the first device 816, or a change of an interference condition at the second device 818.

In one configuration, referring to FIG. 8, the diode bias voltage configuration at 812 may be based on one or more of an orientation of the network node 804, a location of the network node 804, a location of the first device 816, a transmit beam direction of the first device 816, a transmit beam width of the first device 816, or a transmit beam peak gain of the first device 816.

In one configuration, referring to FIG. 8, the plurality of diodes or the plurality of RIS elements may include one or more groups of diodes or one or more groups of RIS elements. The diode bias voltage configuration at 812 may indicate a respective uniform bias voltage for each group of diodes or each group of RIS elements in the one or more groups of diodes or the one or more groups of RIS elements.

In one configuration, referring to FIG. 8, the diode bias voltage configuration at 812 may indicate a respective bias voltage selected from a preconfigured number of usable bias voltages for at least one diode or at least one RIS element that is on in the plurality of diodes or the plurality of RIS elements. The at least one diode or the at least one RIS element may be on based on the RIS pattern configuration at 810.

In one configuration, referring to FIG. 8, the diode bias voltage configuration at 812 may indicate at least one bias voltage for at least one diode or at least one RIS element that is on in the plurality of diodes or the plurality of RIS elements based on a difference between the at least one bias voltage and a reference bias voltage. The at least one diode or the at least one RIS element may be on based on the RIS pattern configuration at 810.

In one configuration, the reference bias voltage may be one of a bias voltage for a specified diode or RIS element, a base bias voltage, or a previous bias voltage for the at least one diode or the at least one RIS element.

In one configuration, at 1012, the network node may receive an indication to activate an autonomous diode bias voltage configuration mode form the network entity. For example, 1012 may be performed by the component 198 in FIG. 14. Referring to FIG. 8, at 820, the network node 804 may receive an indication to activate an autonomous diode bias voltage configuration mode form the network entity 802.

At 1014, the network node may configure one or more diode bias voltages for the plurality of diodes or the plurality of RIS elements of the network node autonomously based on the autonomous diode bias voltage configuration mode and one or more of the RIS pattern configuration, an available RIS power budget, an interference tolerance margin at the second device, or a distortion tolerance margin at the second device. For example, 1014 may be performed by the component 198 in FIG. 14. Referring to FIG. 8, at 822, the network node 804 may configure one or more diode bias voltages for the plurality of diodes or the plurality of RIS elements of the network node 804 autonomously based on the autonomous diode bias voltage configuration mode and one or more of the RIS pattern configuration at 810, an available RIS power budget, an interference tolerance margin at the second device 818, or a distortion tolerance margin at the second device 818.

In one configuration, the autonomous diode bias voltage configuration mode may be associated with a validity period.

In one configuration, the autonomous diode bias voltage configuration mode may be from a plurality of preconfigured usable autonomous diode bias voltage configuration modes. Each preconfigured usable autonomous diode bias voltage configuration mode in the plurality of preconfigured usable autonomous diode bias voltage configuration modes may be associated with a respective maximum distortion level or a respective maximum non-linearity level.

In one configuration, referring to FIG. 8, the network node 804 may include a RIS.

Figure 11:
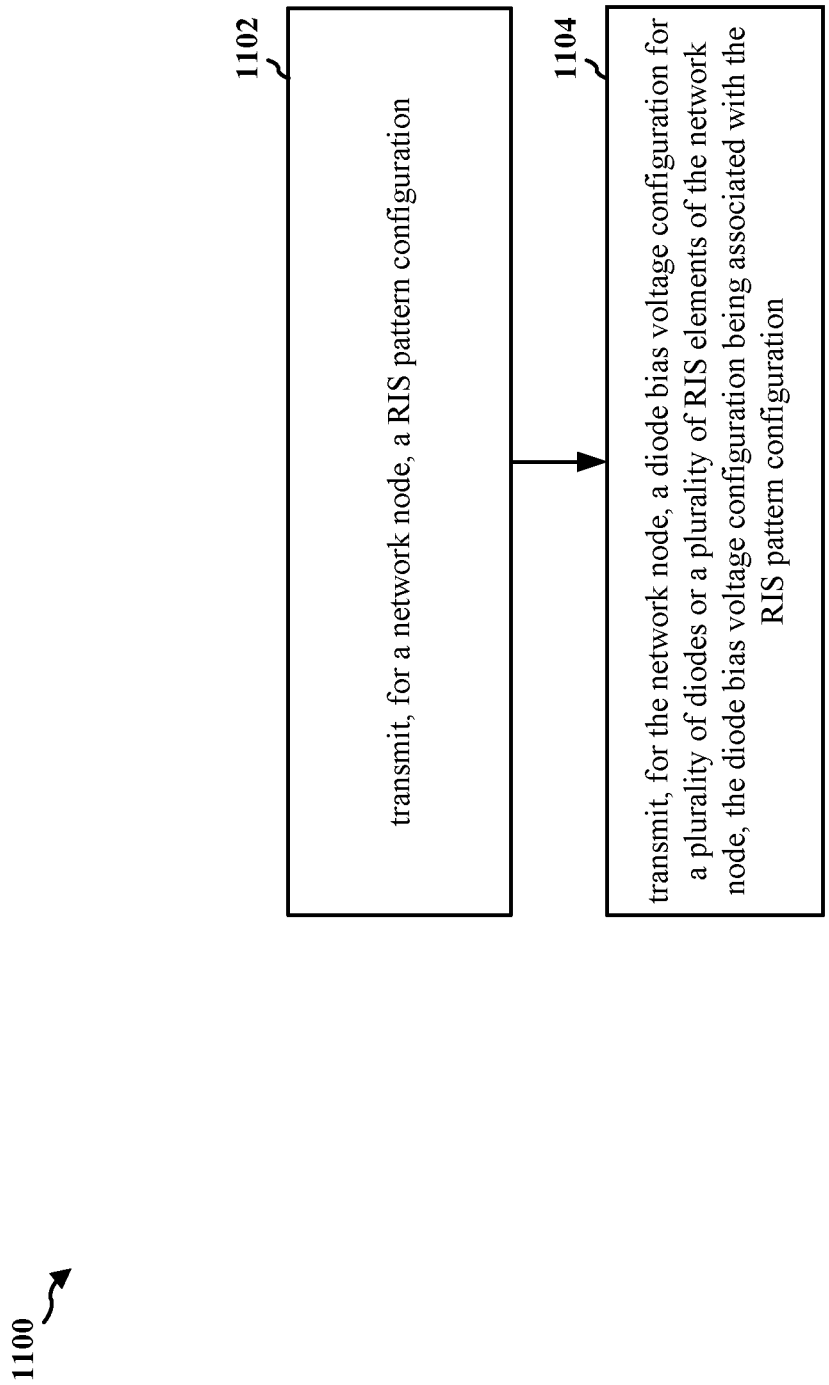
FIG. 11 is a flowchart of a method of wireless communication.

FIG. 11 is a flowchart 1100 of a method of wireless communication. The method may be performed by a network entity (e.g., the base station 102/310; the network entity 702/802/1302/1402). At 1102, the network entity may transmit, for a network node, a RIS pattern configuration. For example, 1102 may be performed by the component 199 in FIG. 13. Referring to FIG. 8, at 810, the network entity 802 may transmit, for a network node 804, a RIS pattern configuration.

At 1104, the network entity may transmit, for the network node, a diode bias voltage configuration for a plurality of diodes or a plurality of RIS elements of the network node. The diode bias voltage configuration may be associated with the RIS pattern configuration. At least one transmission may be forwarded from a first device to a second device via the network node in one of an uplink, a downlink, or a sidelink based on the RIS pattern configuration and the diode bias voltage configuration. For example, 1104 may be performed by the component 199 in FIG. 13. Referring to FIG. 8, at 812, the network entity 802 may transmit, for the network node 804, a diode bias voltage configuration for a plurality of diodes or a plurality of RIS elements of the network node 804.

Figure 12:
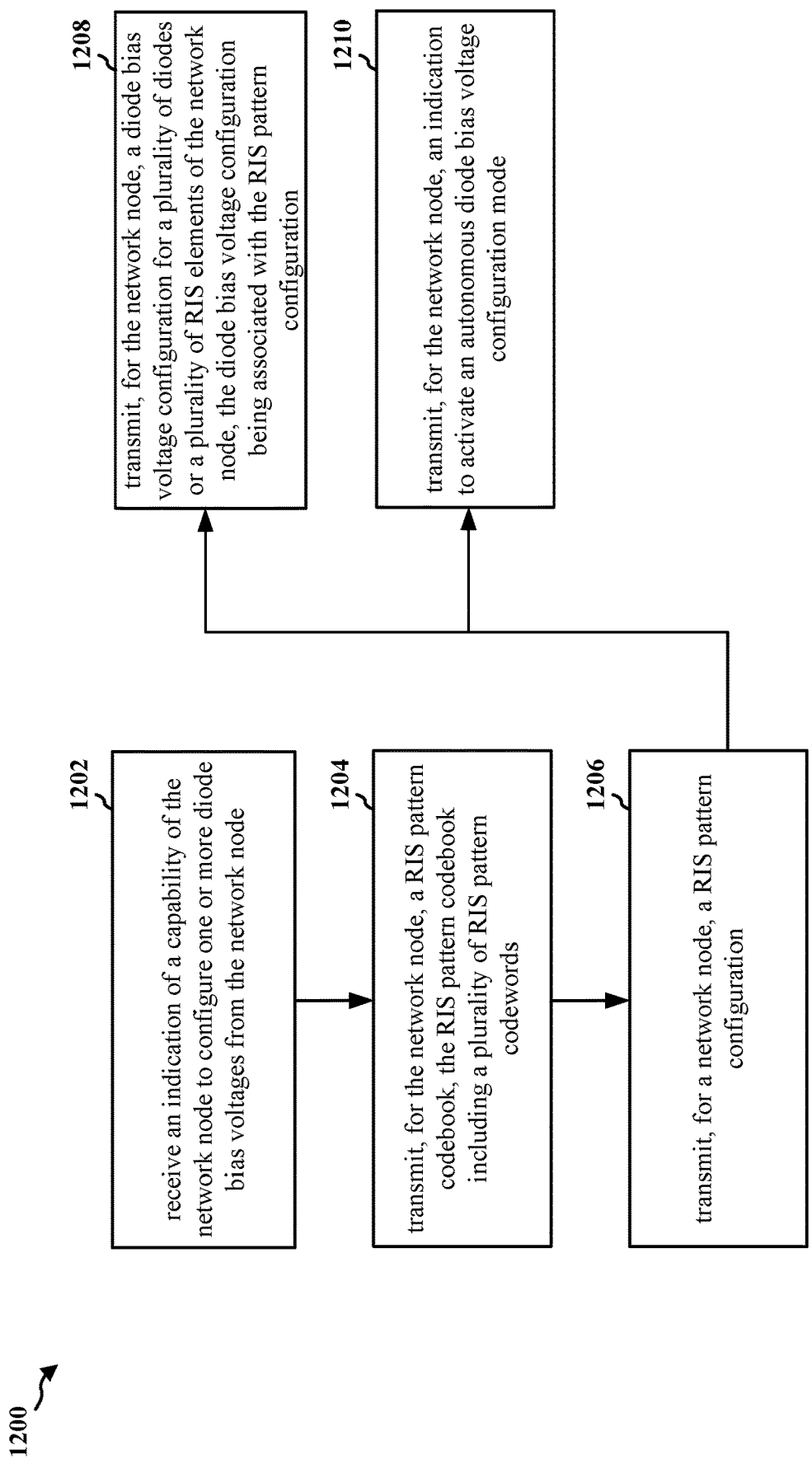
FIG. 12 is a flowchart of a method of wireless communication.

FIG. 12 is a flowchart 1200 of a method of wireless communication. The method may be performed by a network entity (e.g., the base station 102/310; the network entity 702/802/1302/1402). At 1206, the network entity may transmit, for a network node, a RIS pattern configuration. For example, 1206 may be performed by the component 199 in FIG. 13. Referring to FIG. 8, at 810, the network entity 802 may transmit, for a network node 804, a RIS pattern configuration.

At 1208, the network entity may transmit, for the network node, a diode bias voltage configuration for a plurality of diodes or a plurality of RIS elements of the network node. The diode bias voltage configuration may be associated with the RIS pattern configuration. At least one transmission may be forwarded from a first device to a second device via the network node in one of an uplink, a downlink, or a sidelink based on the RIS pattern configuration and the diode bias voltage configuration. For example, 1208 may be performed by the component 199 in FIG. 13. Referring to FIG. 8, at 812, the network entity 802 may transmit, for the network node 804, a diode bias voltage configuration for a plurality of diodes or a plurality of RIS elements of the network node 804.

In one configuration, referring to FIG. 8, the RIS pattern configuration at 810 may correspond to a codeword in a RIS pattern codebook at 808.

In one configuration, at 1202, the network entity may receive an indication of a capability of the network node to configure one or more diode bias voltages from the network node. For example, 1202 may be performed by the component 199 in FIG. 13. Referring to FIG. 8, at 806, the network entity 802 may receive an indication of a capability of the network node 804 to configure one or more diode bias voltages from the network node 804.

At 1204, the network entity may transmit, for the network node, a RIS pattern codebook. The RIS pattern codebook may include a plurality of RIS pattern codewords. Each RIS pattern codeword in the plurality of RIS pattern codewords may correspond to a respective usable RIS pattern configuration of a plurality of usable RIS pattern configurations. Each usable RIS pattern configuration in the plurality of usable RIS pattern configurations may be associated with a reflected signal main lobe profile or one or more reflected signal sidelobe profiles. For example, 1204 may be performed by the component 199 in FIG. 13. Referring to FIG. 8, at 808, the network entity 802 may transmit, for the network node 804, a RIS pattern codebook.

In one configuration, referring to FIG. 8, the RIS pattern configuration may be transmitted at 810 for the network node 804 based on at least one of: a change of the first device 816, a change of the second device 818, a change of a location of the first device 816, a change of a location of the second device 818, a change in a network topology, an indication that a gain at the second device 818 is less than a threshold, an indication of one or more protected directions, a change in the one or more protected directions, or a configuration sweep indicated by the network entity 802.

In one configuration, referring to FIG. 8, the diode bias voltage configuration may be transmitted at 812 for the network node 804 based on at least one of: the transmitted RIS pattern configuration at 810, a change of an interference condition at the first device 816, or a change of an interference condition at the second device 818.

In one configuration, referring to FIG. 8, the diode bias voltage configuration at 812 may be based on one or more of an orientation of the network node 804, a location of the network node 804, a location of the first device 816, a transmit beam direction of the first device 816, a transmit beam width of the first device 816, or a transmit beam peak gain of the first device 816.

In one configuration, referring to FIG. 8, the plurality of diodes or the plurality of RIS elements may include one or more groups of diodes or one or more groups of RIS elements. The diode bias voltage configuration at 812 may indicate a respective uniform bias voltage for each group of diodes or each group of RIS elements in the one or more groups of diodes or the one or more groups of RIS elements.

In one configuration, referring to FIG. 8, the diode bias voltage configuration at 812 may indicate a respective bias voltage selected from a preconfigured number of usable bias voltages for at least one diode or at least one RIS element that is on in the plurality of diodes or the plurality of RIS elements. The at least one diode or the at least one RIS element may be on based on the RIS pattern configuration at 810.

In one configuration, referring to FIG. 8, the diode bias voltage configuration at 812 may indicate at least one bias voltage for at least one diode or at least one RIS element that is on in the plurality of diodes or the plurality of RIS elements based on a difference between the at least one bias voltage and a reference bias voltage. The at least one diode or the at least one RIS element may be on based on the RIS pattern configuration.

In one configuration, the reference bias voltage may be one of a bias voltage for a specified diode or RIS element, a base bias voltage, or a previous bias voltage for the at least one diode or the at least one RIS element.

In one configuration, at 1210, the network entity may transmit, for the network node, an indication to activate an autonomous diode bias voltage configuration mode. One or more diode bias voltages for the plurality of diodes or the plurality of RIS elements of the network node may be autonomously based on the autonomous diode bias voltage configuration mode and one or more of the RIS pattern configuration, an available RIS power budget, an interference tolerance margin at the second device, or a distortion tolerance margin at the second device. For example, 1210 may be performed by the component 199 in FIG. 13. Referring to FIG. 8, at 820, the network entity 802 may transmit, for the network node 804, an indication to activate an autonomous diode bias voltage configuration mode.

In one configuration, the autonomous diode bias voltage configuration mode may be associated with a validity period.

In one configuration, the autonomous diode bias voltage configuration mode may be selected from a plurality of preconfigured usable autonomous diode bias voltage configuration modes. Each preconfigured usable autonomous diode bias voltage configuration mode in the plurality of preconfigured usable autonomous diode bias voltage configuration modes may be associated with a respective maximum distortion level or a respective maximum non-linearity level.

In one configuration, referring to FIG. 8, the network node 804 may include a RIS.

Figure 13:
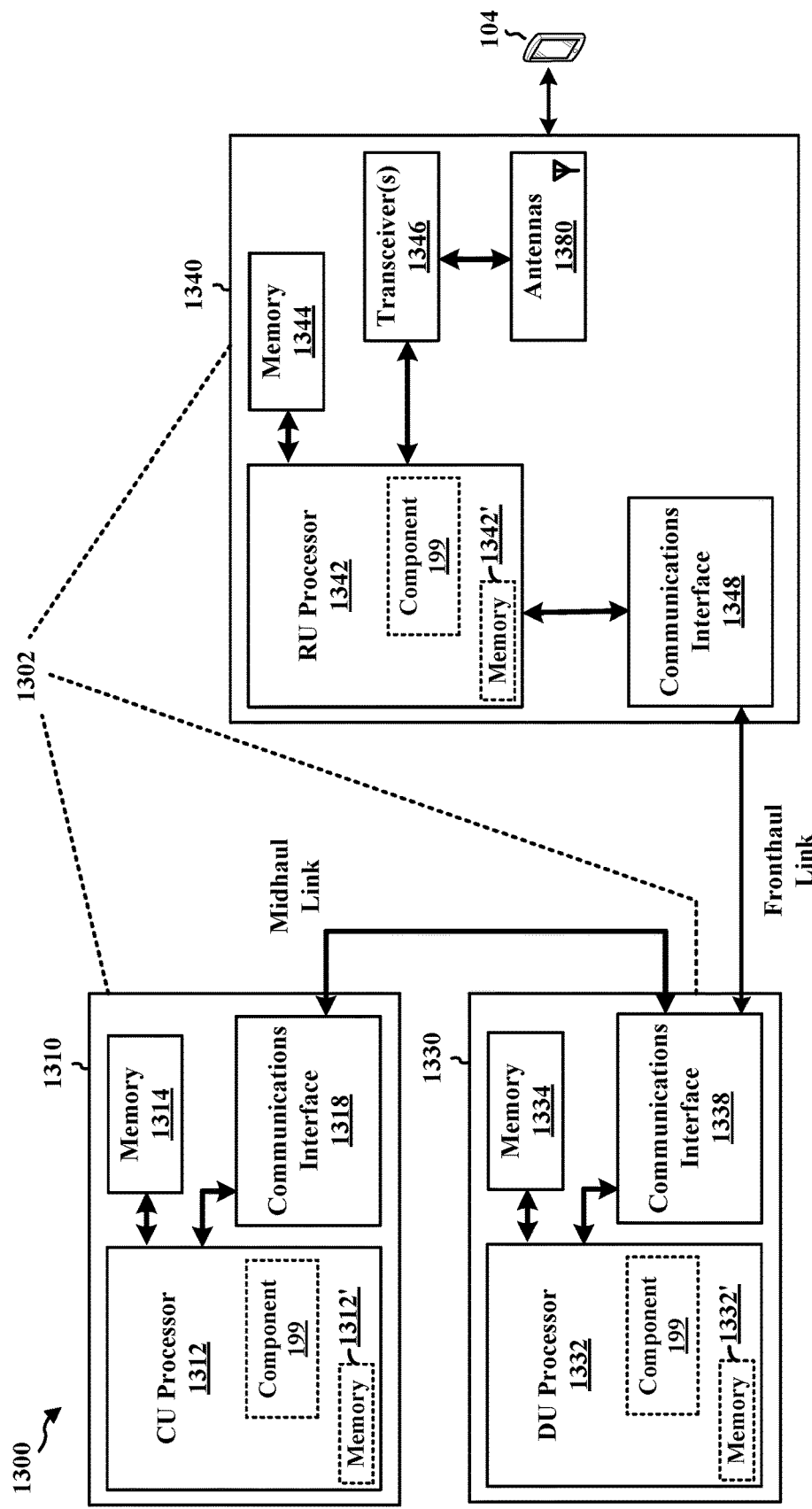
FIG. 13 is a diagram illustrating an example of a hardware implementation for an example network entity.

FIG. 13 is a diagram 1300 illustrating an example of a hardware implementation for a network entity 1302. The network entity 1302 may be a BS, a component of a BS, or may implement BS functionality. The network entity 1302 may include at least one of a CU 1310, a DU 1330, or an RU 1340. For example, depending on the layer functionality handled by the component 199, the network entity 1302 may include the CU 1310; both the CU 1310 and the DU 1330; each of the CU 1310, the DU 1330, and the RU 1340; the DU 1330; both the DU 1330 and the RU 1340; or the RU 1340. The CU 1310 may include a CU processor 1312. The CU processor 1312 may include on-chip memory 1312'. In some aspects, the CU 1310 may further include additional memory modules 1314 and a communications interface 1318. The CU 1310 communicates with the DU 1330 through a midhaul link, such as an F1 interface. The DU 1330 may include a DU processor 1332. The DU processor 1332 may include on-chip memory 1332'. In some aspects, the DU 1330 may further include additional memory modules 1334 and a communications interface 1338. The DU 1330 communicates with the RU 1340 through a fronthaul link. The RU 1340 may include an RU processor 1342. The RU processor 1342 may include on-chip memory 1342'. In some aspects, the RU 1340 may further include additional memory modules 1344, one or more transceivers 1346, antennas 1380, and a communications interface 1348. The RU 1340 communicates with the UE 104. The on-chip memory 1312', 1332', 1342' and the additional memory modules 1314, 1334, 1344 may each be considered a computer-readable medium/memory. Each computer-readable medium/memory may be non-transitory. Each of the processors 1312, 1332, 1342 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to transmit, for a network node, a RIS pattern configuration. The component 199 may be configured to transmit, for the network node, a diode bias voltage configuration for a plurality of diodes or a plurality of RIS elements of the network node. The diode bias voltage configuration may be associated with the RIS pattern configuration. At least one transmission may be forwarded from a first device to a second device via the network node in one of an uplink, a downlink, or a sidelink based on the RIS pattern configuration and the diode bias voltage configuration. The component 199 may be within one or more processors of one or more of the CU 1310, DU 1330, and the RU 1340. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1302 may include a variety of components configured for various functions. In one configuration, the network entity 1302 may include means for transmitting, for a network node, a RIS pattern configuration. The network entity 1302 may include means for transmitting, for the network node, a diode bias voltage configuration for a plurality of diodes or a plurality of RIS elements of the network node. The diode bias voltage configuration may be associated with the RIS pattern configuration. At least one transmission may be forwarded from a first device to a second device via the network node in one of an uplink, a downlink, or a sidelink based on the RIS pattern configuration and the diode bias voltage configuration.

In one configuration, the RIS pattern configuration may correspond to a codeword in a RIS pattern codebook. In one configuration, the network entity 1302 may include means for receiving an indication of a capability of the network node to configure one or more diode bias voltages from the network node. The network entity 1302 may include means for transmitting, for the network node, a RIS pattern codebook. The RIS pattern codebook may include a plurality of RIS pattern codewords. Each RIS pattern codeword in the plurality of RIS pattern codewords may correspond to a respective usable RIS pattern configuration of a plurality of usable RIS pattern configurations. Each usable RIS pattern configuration in the plurality of usable RIS pattern configurations may be associated with a reflected signal main lobe profile or one or more reflected signal sidelobe profiles. In one configuration, the RIS pattern configuration may be transmitted for the network node based on at least one of: a change of the first device, a change of the second device, a change of a location of the first device, a change of a location of the second device, a change in a network topology, an indication that a gain at the second device is less than a threshold, an indication of one or more protected directions, a change in the one or more protected directions, or a configuration sweep indicated by the network entity. In one configuration, the diode bias voltage configuration may be transmitted for the network node based on at least one of: the transmitted RIS pattern configuration, a change of an interference condition at the first device, or a change of an interference condition at the second device. In one configuration, the diode bias voltage configuration may be based on one or more of an orientation of the network node, a location of the network node, a location of the first device, a transmit beam direction of the first device, a transmit beam width of the first device, or a transmit beam peak gain of the first device. In one configuration, the plurality of diodes or the plurality of RIS elements may include one or more groups of diodes or one or more groups of RIS elements. The diode bias voltage configuration may indicate a respective uniform bias voltage for each group of diodes or each group of RIS elements in the one or more groups of diodes or the one or more groups of RIS elements. In one configuration, the diode bias voltage configuration may indicate a respective bias voltage selected from a preconfigured number of usable bias voltages for at least one diode or at least one RIS element that is on in the plurality of diodes or the plurality of RIS elements. The at least one diode or the at least one RIS element may be on based on the RIS pattern configuration. In one configuration, the diode bias voltage configuration may indicate at least one bias voltage for at least one diode or at least one RIS element that is on in the plurality of diodes or the plurality of RIS elements based on a difference between the at least one bias voltage and a reference bias voltage. The at least one diode or the at least one RIS element may be on based on the RIS pattern configuration. In one configuration, the reference bias voltage may be one of a bias voltage for a specified diode or RIS element, a base bias voltage, or a previous bias voltage for the at least one diode or the at least one RIS element. In one configuration, the network entity 1302 may include means for transmitting, for the network node, an indication to activate an autonomous diode bias voltage configuration mode. One or more diode bias voltages for the plurality of diodes or the plurality of RIS elements of the network node may be autonomously based on the autonomous diode bias voltage configuration mode and one or more of the RIS pattern configuration, an available RIS power budget, an interference tolerance margin at the second device, or a distortion tolerance margin at the second device. In one configuration, the autonomous diode bias voltage configuration mode may be associated with a validity period. In one configuration, the autonomous diode bias voltage configuration mode may be selected from a plurality of preconfigured usable autonomous diode bias voltage configuration modes. Each preconfigured usable autonomous diode bias voltage configuration mode in the plurality of preconfigured usable autonomous diode bias voltage configuration modes may be associated with a respective maximum distortion level or a respective maximum non-linearity level. In one configuration, the network node may include a RIS.

The means may be the component 199 of the network entity 1302 configured to perform the functions recited by the means. As described supra, the network entity 1302 may include the TX processor 316, the RX processor 370, and the controller/processor 375. As such, in one configuration, the means may be the TX processor 316, the RX processor 370, and/or the controller/processor 375 configured to perform the functions recited by the means.

Figure 14:
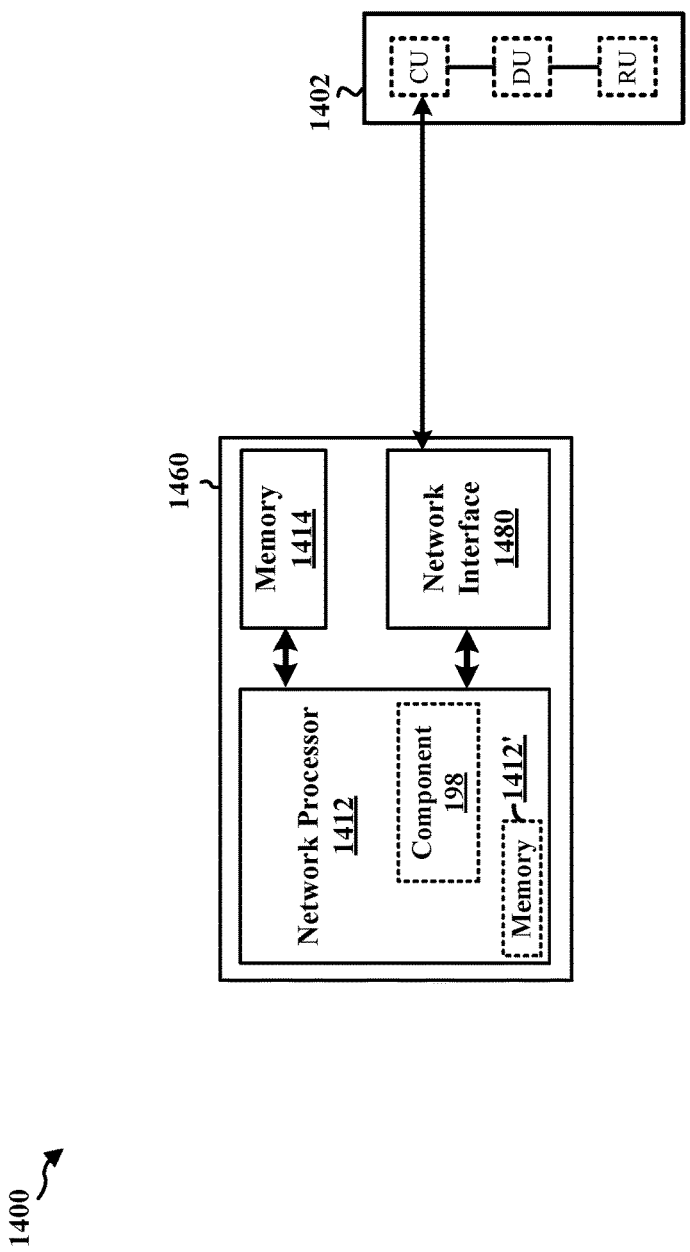
FIG. 14 is a diagram illustrating an example of a hardware implementation for an example network entity.

FIG. 14 is a diagram 1400 illustrating an example of a hardware implementation for a network entity 1460. In one example, the network entity 1460 may be within the core network 120. The network entity 1460 may include a network processor 1412. The network processor 1412 may include on-chip memory 1412'. In some aspects, the network entity 1460 may further include additional memory modules 1414. The network entity 1460 communicates via the network interface 1480 directly (e.g., backhaul link) or indirectly (e.g., through a RIC) with the CU 1402. The on-chip memory 1412' and the additional memory modules 1414 may each be considered a computer-readable medium/memory. Each computer-readable medium/memory may be non-transitory. The processor 1412 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 198 may be configured to receive a RIS pattern configuration from a network entity. The component 198 may be configured to receive a diode bias voltage configuration for a plurality of diodes or a plurality of RIS elements of the network node from the network entity. The diode bias voltage configuration may be associated with the RIS pattern configuration. The component 198 may be configured to forward at least one transmission from a first device to a second device via the network node in one of an uplink, a downlink, or a sidelink based on the RIS pattern configuration and the diode bias voltage configuration. The component 198 may be within the processor 1412. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1460 may include a variety of components configured for various functions. In one configuration, the network entity 1460 may include means for receiving a RIS pattern configuration from a network entity. The network entity 1460 may include means for receiving a diode bias voltage configuration for a plurality of diodes or a plurality of RIS elements of the network node from the network entity. The diode bias voltage configuration may be associated with the RIS pattern configuration. The network entity 1460 may include means for forwarding at least one transmission from a first device to a second device via the network node in one of an uplink, a downlink, or a sidelink based on the RIS pattern configuration and the diode bias voltage configuration.

In one configuration, the RIS pattern configuration may correspond to a codeword in a RIS pattern codebook. In one configuration, the network entity 1460 may include means for transmitting, for the network entity, an indication of a capability of the network node to configure one or more diode bias voltages. The network entity 1460 may include means for receiving a RIS pattern codebook from the network entity, the RIS pattern codebook including a plurality of RIS pattern codewords, each RIS pattern codeword in the plurality of RIS pattern codewords corresponding to a respective usable RIS pattern configuration of a plurality of usable RIS pattern configurations, each usable RIS pattern configuration in the plurality of usable RIS pattern configurations being associated with a reflected signal main lobe profile or one or more reflected signal sidelobe profiles. In one configuration, the RIS pattern configuration may be received from the network entity based on at least one of: a change of the first device, a change of the second device, a change of a location of the first device, a change of a location of the second device, a change in a network topology, an indication that a gain at the second device is less than a threshold, an indication of one or more protected directions, a change in the one or more protected directions, or a configuration sweep indicated by the network entity. In one configuration, the diode bias voltage configuration may be received from the network entity based on at least one of: the received RIS pattern configuration, a change of an interference condition at the first device, or a change of an interference condition at the second device. In one configuration, the diode bias voltage configuration may be based on one or more of an orientation of the network node, a location of the network node, a location of the first device, a transmit beam direction of the first device, a transmit beam width of the first device, or a transmit beam peak gain of the first device. In one configuration, the plurality of diodes or the plurality of RIS elements may include one or more groups of diodes or one or more groups of RIS elements. The diode bias voltage configuration may indicate a respective uniform bias voltage for each group of diodes or each group of RIS elements in the one or more groups of diodes or the one or more groups of RIS elements. In one configuration, the diode bias voltage configuration may indicate a respective bias voltage selected from a preconfigured number of usable bias voltages for at least one diode or at least one RIS element that is on in the plurality of diodes or the plurality of RIS elements. The at least one diode or the at least one RIS element may be on based on the RIS pattern configuration. In one configuration, the diode bias voltage configuration may indicate at least one bias voltage for at least one diode or at least one RIS element that is on in the plurality of diodes or the plurality of RIS elements based on a difference between the at least one bias voltage and a reference bias voltage. The at least one diode or the at least one RIS element may be on based on the RIS pattern configuration. In one configuration, the reference bias voltage may be one of a bias voltage for a specified diode or RIS element, a base bias voltage, or a previous bias voltage for the at least one diode or the at least one RIS element. In one configuration, the network entity 1460 may include means for receiving an indication to activate an autonomous diode bias voltage configuration mode form the network entity. The network entity 1460 may include means for configuring one or more diode bias voltages for the plurality of diodes or the plurality of RIS elements of the network node autonomously based on the autonomous diode bias voltage configuration mode and one or more of the RIS pattern configuration, an available RIS power budget, an interference tolerance margin at the second device, or a distortion tolerance margin at the second device. In one configuration, the autonomous diode bias voltage configuration mode may be associated with a validity period. In one configuration, the autonomous diode bias voltage configuration mode may be from a plurality of preconfigured usable autonomous diode bias voltage configuration modes. Each preconfigured usable autonomous diode bias voltage configuration mode in the plurality of preconfigured usable autonomous diode bias voltage configuration modes may be associated with a respective maximum distortion level or a respective maximum non-linearity level. In one configuration, the network node may include a RIS.

The means may be the component 198 of the network entity 1460 configured to perform the functions recited by the means.

Referring back to FIGS. 4-14, a network entity (e.g., a base station) may transmit, for a network node (e.g., a RIS), a RIS pattern configuration. The network entity may transmit, for the network node, a diode bias voltage configuration for a plurality of diodes or a plurality of RIS elements of the network node. The diode bias voltage configuration may be associated with the RIS pattern configuration. The network node may forward at least one transmission from a first device to a second device via the network node in one of an uplink, a downlink, or a sidelink based on the RIS pattern configuration and the diode bias voltage configuration. Accordingly, the power consumption of the RIS may be substantially reduced, while an acceptable level of RIS performance may be maintained.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a network node, including receiving a RIS pattern configuration from a network entity; receiving a diode bias voltage configuration for a plurality of diodes or a plurality of RIS elements of the network node from the network entity, the diode bias voltage configuration being associated with the RIS pattern configuration; and forwarding at least one transmission from a first device to a second device via the network node in one of an uplink, a downlink, or a sidelink based on the RIS pattern configuration and the diode bias voltage configuration.

Aspect 2 is the method of aspect 1, where the RIS pattern configuration corresponds to a codeword in a RIS pattern codebook.

Aspect 3 is the method of any of aspects 1 and 2, further including: transmitting, for the network entity, an indication of a capability of the network node to configure one or more diode bias voltages; and receiving a RIS pattern codebook from the network entity, the RIS pattern codebook including a plurality of RIS pattern codewords, each RIS pattern codeword in the plurality of RIS pattern codewords corresponding to a respective usable RIS pattern configuration of a plurality of usable RIS pattern configurations, each usable RIS pattern configuration in the plurality of usable RIS pattern configurations being associated with a reflected signal main lobe profile or one or more reflected signal sidelobe profiles.

Aspect 4 is the method of any of aspects 1 to 3, where the RIS pattern configuration is received from the network entity based on at least one of: a change of the first device, a change of the second device, a change of a location of the first device, a change of a location of the second device, a change in a network topology, an indication that a gain at the second device is less than a threshold, an indication of one or more protected directions, a change in the one or more protected directions, or a configuration sweep indicated by the network entity.

Aspect 5 is the method of any of aspects 1 to 4, where the diode bias voltage configuration is received from the network entity based on at least one of: the received RIS pattern configuration, a change of an interference condition at the first device, or a change of an interference condition at the second device.

Aspect 6 is the method of any of aspects 1 to 5, where the diode bias voltage configuration is based on one or more of an orientation of the network node, a location of the network node, a location of the first device, a transmit beam direction of the first device, a transmit beam width of the first device, or a transmit beam peak gain of the first device.

Aspect 7 is the method of any of aspects 1 to 6, where the plurality of diodes or the plurality of RIS elements includes one or more groups of diodes or one or more groups of RIS elements, and the diode bias voltage configuration indicates a respective uniform bias voltage for each group of diodes or each group of RIS elements in the one or more groups of diodes or the one or more groups of RIS elements.

Aspect 8 is the method of any of aspects 1 to 6, where the diode bias voltage configuration indicates a respective bias voltage selected from a preconfigured number of usable bias voltages for at least one diode or at least one RIS element that is ON in the plurality of diodes or the plurality of RIS elements, and the at least one diode or the at least one RIS element is ON based on the RIS pattern configuration.

Aspect 9 is the method of any of aspects 1 to 6, where the diode bias voltage configuration indicates at least one bias voltage for at least one diode or at least one RIS element that is ON in the plurality of diodes or the plurality of RIS elements based on a difference between the at least one bias voltage and a reference bias voltage, and the at least one diode or the at least one RIS element is ON based on the RIS pattern configuration.

Aspect 10 is the method of aspect 9, where the reference bias voltage is one of a bias voltage for a specified diode or RIS element, a base bias voltage, or a previous bias voltage for the at least one diode or the at least one RIS element.

Aspect 11 is the method of any of aspects 1 to 10, further including: receiving an indication to activate an autonomous diode bias voltage configuration mode form the network entity; and configure one or more diode bias voltages for the plurality of diodes or the plurality of RIS elements of the network node autonomously based on the autonomous diode bias voltage configuration mode and one or more of the RIS pattern configuration, an available RIS power budget, an interference tolerance margin at the second device, or a distortion tolerance margin at the second device.

Aspect 12 is the method of aspect 11, where the autonomous diode bias voltage configuration mode is associated with a validity period.

Aspect 13 is the method of any of aspects 11 and 12, where the autonomous diode bias voltage configuration mode is from a plurality of preconfigured usable autonomous diode bias voltage configuration modes, and each preconfigured usable autonomous diode bias voltage configuration mode in the plurality of preconfigured usable autonomous diode bias voltage configuration modes is associated with a respective maximum distortion level or a respective maximum non-linearity level.

Aspect 14 is the method of any of aspects 1 to 13, where the network node includes a RIS.

Aspect 15 is a method of wireless communication at a network entity, including transmitting, for a network node, a RIS pattern configuration; and transmitting, for the network node, a diode bias voltage configuration for a plurality of diodes or a plurality of RIS elements of the network node, the diode bias voltage configuration being associated with the RIS pattern configuration, where at least one transmission is forwarded from a first device to a second device via the network node in one of an uplink, a downlink, or a sidelink based on the RIS pattern configuration and the diode bias voltage configuration.

Aspect 16 is the method of aspect 15, where the RIS pattern configuration corresponds to a codeword in a RIS pattern codebook.

Aspect 17 is the method of any of aspects 15 and 16, further including: receiving an indication of a capability of the network node to configure one or more diode bias voltages from the network node; and transmitting, for the network node, a RIS pattern codebook, the RIS pattern codebook including a plurality of RIS pattern codewords, each RIS pattern codeword in the plurality of RIS pattern codewords corresponding to a respective usable RIS pattern configuration of a plurality of usable RIS pattern configurations, each usable RIS pattern configuration in the plurality of usable RIS pattern configurations being associated with a reflected signal main lobe profile or one or more reflected signal sidelobe profiles.

Aspect 18 is the method of any of aspects 15 to 17, where the RIS pattern configuration is transmitted for the network node based on at least one of: a change of the first device, a change of the second device, a change of a location of the first device, a change of a location of the second device, a change in a network topology, an indication that a gain at the second device is less than a threshold, an indication of one or more protected directions, a change in the one or more protected directions, or a configuration sweep indicated by the network entity.

Aspect 19 is the method of any of aspects 15 to 18, where the diode bias voltage configuration is transmitted for the network node based on at least one of: the transmitted RIS pattern configuration, a change of an interference condition at the first device, or a change of an interference condition at the second device.

Aspect 20 is the method of any of aspects 15 to 19, where the diode bias voltage configuration is based on one or more of an orientation of the network node, a location of the network node, a location of the first device, a transmit beam direction of the first device, a transmit beam width of the first device, or a transmit beam peak gain of the first device.

Aspect 21 is the method of any of aspects 15 to 20, where the plurality of diodes or the plurality of RIS elements includes one or more groups of diodes or one or more groups of RIS elements, and the diode bias voltage configuration indicates a respective uniform bias voltage for each group of diodes or each group of RIS elements in the one or more groups of diodes or the one or more groups of RIS elements.

Aspect 22 is the method of any of aspects 15 to 20, where the diode bias voltage configuration indicates a respective bias voltage selected from a preconfigured number of usable bias voltages for at least one diode or at least one RIS element that is ON in the plurality of diodes or the plurality of RIS elements, and the at least one diode or the at least one RIS element is ON based on the RIS pattern configuration.

Aspect 23 is the method of any of aspects 15 to 20, where the diode bias voltage configuration indicates at least one bias voltage for at least one diode or at least one RIS element that is ON in the plurality of diodes or the plurality of RIS elements based on a difference between the at least one bias voltage and a reference bias voltage, and the at least one diode or the at least one RIS element is ON based on the RIS pattern configuration.

Aspect 24 is the method of aspect 23, where the reference bias voltage is one of a bias voltage for a specified diode or RIS element, a base bias voltage, or a previous bias voltage for the at least one diode or the at least one RIS element.

Aspect 25 is the method of any of aspects 15 to 24, further including: transmitting, for the network node, an indication to activate an autonomous diode bias voltage configuration mode, where one or more diode bias voltages for the plurality of diodes or the plurality of RIS elements of the network node is, at the network node, autonomously based on the autonomous diode bias voltage configuration mode and one or more of the RIS pattern configuration, an available RIS power budget, an interference tolerance margin at the second device, or a distortion tolerance margin at the second device.

Aspect 26 is the method of aspect 25, where the autonomous diode bias voltage configuration mode is associated with a validity period.

Aspect 27 is the method of any of aspects 25 and 26, where the autonomous diode bias voltage configuration mode is selected from a plurality of preconfigured usable autonomous diode bias voltage configuration modes, and each preconfigured usable autonomous diode bias voltage configuration mode in the plurality of preconfigured usable autonomous diode bias voltage configuration modes is associated with a respective maximum distortion level or a respective maximum non-linearity level.

Aspect 28 is the method of any of aspects 15 to 27, where the network node includes a RIS.

Aspect 29 is an apparatus for wireless communication including at least one processor coupled to a memory and, based at least in part on information stored in the memory, the at least one processor is configured to implement a method as in any of aspects 1 to 28.

Aspect 30 may be combined with aspect 29 and further includes a transceiver coupled to the at least one processor.

Aspect 31 is an apparatus for wireless communication including means for implementing any of aspects 1 to 28.

Aspect 32 is a non-transitory computer-readable storage medium storing computer executable code, where the code when executed by a processor causes the processor to implement any of aspects 1 to 28.

Various aspects have been described herein. These and other aspects are within the scope of the following claims.

What is claimed is:

1. An apparatus for wireless communication at a network node, comprising:
   a memory; and
   at least one processor coupled to the memory and, based at least in part on information stored in the memory, the at least one processor is configured to:
   receive a reconfigurable intelligent surface (RIS) pattern configuration from a network entity;
   receive a diode bias voltage configuration for a plurality of diodes or a plurality of RIS elements of the network node from the network entity, the diode bias voltage configuration being associated with the RIS pattern configuration; and
   forward at least one transmission from a first device to a second device via the network node in one of an uplink, a downlink, or a sidelink based on the RIS pattern configuration and the diode bias voltage configuration.

2. The apparatus of claim 1, wherein the RIS pattern configuration corresponds to a codeword in a RIS pattern codebook.

3. The apparatus of claim 1, the at least one processor being further configured to:
   transmit, for the network entity, an indication of a capability of the network node to configure one or more diode bias voltages; and
   receive a RIS pattern codebook from the network entity, the RIS pattern codebook including a plurality of RIS pattern codewords, each RIS pattern codeword in the plurality of RIS pattern codewords corresponding to a respective usable RIS pattern configuration of a plurality of usable RIS pattern configurations, each usable RIS pattern configuration in the plurality of usable RIS pattern configurations being associated with a reflected signal main lobe profile or one or more reflected signal sidelobe profiles.

4. The apparatus of claim 1, wherein the RIS pattern configuration is received from the network entity based on at least one of:
   a change of the first device,
   a change of the second device,
   a change of a first location of the first device,
   a change of a second location of the second device,
   a change in a network topology,
   an indication that a gain at the second device is less than a threshold,
   an indication of one or more protected directions,
   a change in the one or more protected directions, or
   a configuration sweep indicated by the network entity.

5. The apparatus of claim 1, wherein the diode bias voltage configuration is received from the network entity based on at least one of:
   the received RIS pattern configuration,
   a change of an interference condition at the first device, or
   a change of an interference condition at the second device.

6. The apparatus of claim 1, wherein the diode bias voltage configuration is based on one or more of an orientation of the network node, a location of the network node, a location of the first device, a transmit beam direction of the first device, a transmit beam width of the first device, or a transmit beam peak gain of the first device.

7. The apparatus of claim 1, wherein the plurality of diodes or the plurality of RIS elements includes one or more groups of diodes or one or more groups of RIS elements, and the diode bias voltage configuration indicates a respective uniform bias voltage for each group of diodes or each group of RIS elements in the one or more groups of diodes or the one or more groups of RIS elements.

8. The apparatus of claim 1, wherein the diode bias voltage configuration indicates a respective bias voltage selected from a preconfigured number of usable bias voltages for at least one diode or at least one RIS element that is ON in the plurality of diodes or the plurality of RIS elements, and the at least one diode or the at least one RIS element is ON based on the RIS pattern configuration.

9. The apparatus of claim 1, wherein the diode bias voltage configuration indicates at least one bias voltage for at least one diode or at least one RIS element that is ON in the plurality of diodes or the plurality of RIS elements based on a difference between the at least one bias voltage and a reference bias voltage, and the at least one diode or the at least one RIS element is ON based on the RIS pattern configuration.

10. The apparatus of claim 9, wherein the reference bias voltage is one of a bias voltage for a specified diode or RIS element, a base bias voltage, or a previous bias voltage for the at least one diode or the at least one RIS element.

11. The apparatus of claim 1, the at least one processor being further configured to:
receive an indication to activate an autonomous diode bias voltage configuration mode form the network entity; and
configure one or more diode bias voltages for the plurality of diodes or the plurality of RIS elements of the network node autonomously based on the autonomous diode bias voltage configuration mode and one or more of the RIS pattern configuration, an available RIS power budget, an interference tolerance margin at the second device, or a distortion tolerance margin at the second device.

12. The apparatus of claim 11, wherein the autonomous diode bias voltage configuration mode is associated with a validity period.

13. The apparatus of claim 11, wherein the autonomous diode bias voltage configuration mode is from a plurality of preconfigured usable autonomous diode bias voltage configuration modes, and each preconfigured usable autonomous diode bias voltage configuration mode in the plurality of preconfigured usable autonomous diode bias voltage configuration modes is associated with a respective maximum distortion level or a respective maximum non-linearity level.

14. The apparatus of claim 1, further comprising a transceiver coupled to the at least one processor, the transceiver being configured to receive the RIS pattern configuration, receive the diode bias voltage configuration, and forward the at least one transmission, wherein the network node includes a RIS.

15. A method of wireless communication at a network node, comprising:
receiving a reconfigurable intelligent surface (RIS) pattern configuration from a network entity;
receiving a diode bias voltage configuration for a plurality of diodes or a plurality of RIS elements of the network node from the network entity, the diode bias voltage configuration being associated with the RIS pattern configuration; and
forwarding at least one transmission from a first device to a second device via the network node in one of an uplink, a downlink, or a sidelink based on the RIS pattern configuration and the diode bias voltage configuration.

16. An apparatus for wireless communication at a network entity, comprising:
a memory; and
at least one processor coupled to the memory and, based at least in part on information stored in the memory, the at least one processor is configured to:
transmit, for a network node, a reconfigurable intelligent surface (RIS) pattern configuration; and
transmit, for the network node, a diode bias voltage configuration for a plurality of diodes or a plurality of RIS elements of the network node, the diode bias voltage configuration being associated with the RIS pattern configuration,
wherein at least one transmission is forwarded from a first device to a second device via the network node in one of an uplink, a downlink, or a sidelink based on the RIS pattern configuration and the diode bias voltage configuration.

17. The apparatus of claim 16, wherein the RIS pattern configuration corresponds to a codeword in a RIS pattern codebook.

18. The apparatus of claim 16, the at least one processor being further configured to:
receive an indication of a capability of the network node to configure one or more diode bias voltages from the network node; and
transmit, for the network node, a RIS pattern codebook, the RIS pattern codebook including a plurality of RIS pattern codewords, each RIS pattern codeword in the plurality of RIS pattern codewords corresponding to a respective usable RIS pattern configuration of a plurality of usable RIS pattern configurations, each usable RIS pattern configuration in the plurality of usable RIS pattern configurations being associated with a reflected signal main lobe profile or one or more reflected signal sidelobe profiles.

19. The apparatus of claim 16, wherein the RIS pattern configuration is transmitted for the network node based on at least one of:
a change of the first device,
a change of the second device,
a change of a first location of the first device,
a change of a second location of the second device,
a change in a network topology,
an indication that a gain at the second device is less than a threshold,
an indication of one or more protected directions,
a change in the one or more protected directions, or
a configuration sweep indicated by the network entity.

20. The apparatus of claim 16, wherein the diode bias voltage configuration is transmitted for the network node based on at least one of:
the transmitted RIS pattern configuration,
a change of an interference condition at the first device, or
a change of an interference condition at the second device.

21. The apparatus of claim 16, wherein the diode bias voltage configuration is based on one or more of an orientation of the network node, a location of the network node, a location of the first device, a transmit beam direction of the first device, a transmit beam width of the first device, or a transmit beam peak gain of the first device.

22. The apparatus of claim 16, wherein the plurality of diodes or the plurality of RIS elements includes one or more groups of diodes or one or more groups of RIS elements, and the diode bias voltage configuration indicates a respective uniform bias voltage for each group of diodes or each group of RIS elements in the one or more groups of diodes or the one or more groups of RIS elements.

23. The apparatus of claim 16, wherein the diode bias voltage configuration indicates a respective bias voltage selected from a preconfigured number of usable bias voltages for at least one diode or at least one RIS element that is ON in the plurality of diodes or the plurality of RIS elements, and the at least one diode or the at least one RIS element is ON based on the RIS pattern configuration.

24. The apparatus of claim 16, wherein the diode bias voltage configuration indicates at least one bias voltage for at least one diode or at least one RIS element that is ON in the plurality of diodes or the plurality of RIS elements based on a difference between the at least one bias voltage and a reference bias voltage, and the at least one diode or the at least one RIS element is ON based on the RIS pattern configuration.

25. The apparatus of claim 24, wherein the reference bias voltage is one of a bias voltage for a specified diode or RIS element, a base bias voltage, or a previous bias voltage for the at least one diode or the at least one RIS element.

26. The apparatus of claim 16, the at least one processor being further configured to:
transmit, for the network node, an indication to activate an autonomous diode bias voltage configuration mode,
wherein one or more diode bias voltages for the plurality of diodes or the plurality of RIS elements of the network node is, at the network node, autonomously based on the autonomous diode bias voltage configuration mode and one or more of the RIS pattern configuration, an available RIS power budget, an interference tolerance margin at the second device, or a distortion tolerance margin at the second device.

27. The apparatus of claim 26, wherein the autonomous diode bias voltage configuration mode is associated with a validity period.

28. The apparatus of claim 26, wherein the autonomous diode bias voltage configuration mode is selected from a plurality of preconfigured usable autonomous diode bias voltage configuration modes, and each preconfigured usable autonomous diode bias voltage configuration mode in the plurality of preconfigured usable autonomous diode bias voltage configuration modes is associated with a respective maximum distortion level or a respective maximum non-linearity level.

29. The apparatus of claim 16, further comprising a transceiver coupled to the at least one processor, the transceiver being configured to transmit the RIS pattern configuration and transmit the diode bias voltage configuration, wherein the network node includes a RIS.

30. A method of wireless communication at a network entity, comprising:
transmitting, for a network node, a reconfigurable intelligent surface (RIS) pattern configuration; and
transmitting, for the network node, a diode bias voltage configuration for a plurality of diodes or a plurality of RIS elements of the network node, the diode bias voltage configuration being associated with the RIS pattern configuration,
wherein at least one transmission is forwarded from a first device to a second device via the network node in one of an uplink, a downlink, or a sidelink based on the RIS pattern configuration and the diode bias voltage configuration.

* * * * *